(12) United States Patent
De Souza

(10) Patent No.: US 9,376,330 B2
(45) Date of Patent: Jun. 28, 2016

(54) WATER PRETREATMENT UNIT USING A FLUORINATED LIQUID

(75) Inventor: Guillaume De Souza, Issy les Moulineaux (FR)

(73) Assignee: ADIONICS, Paris (FR)

( * ) Notice: Subject to any disclaimer, the term of this patent is extended or adjusted under 35 U.S.C. 154(b) by 968 days.

(21) Appl. No.: 13/145,661

(22) PCT Filed: Feb. 2, 2010

(86) PCT No.: PCT/FR2010/050169
§ 371 (c)(1),
(2), (4) Date: Sep. 28, 2011

(87) PCT Pub. No.: WO2010/086575
PCT Pub. Date: Aug. 5, 2010

(65) Prior Publication Data
US 2012/0012529 A1 Jan. 19, 2012

(30) Foreign Application Priority Data
Feb. 2, 2009 (FR) .................................... 09 50643

(51) Int. Cl.
| | | |
|---|---|---|
| *F28C 3/04* | (2006.01) | |
| *C02F 1/10* | (2006.01) | |
| C02F 1/42 | (2006.01) | |
| C02F 1/04 | (2006.01) | |
| C02F 1/06 | (2006.01) | |
| C02F 1/22 | (2006.01) | |
| C02F 1/44 | (2006.01) | |
| C02F 103/08 | (2006.01) | |

(52) U.S. Cl.
CPC ... *C02F 1/10* (2013.01); *F28C 3/04* (2013.01); *C02F 1/042* (2013.01); *C02F 1/06* (2013.01); *C02F 1/22* (2013.01); *C02F 1/441* (2013.01); *C02F 2103/08* (2013.01)

(58) Field of Classification Search
CPC ................ C02F 1/04; C02F 1/10; C02F 1/23; B01D 3/00; B01D 3/02; B01D 3/38
USPC ....... 521/25; 203/10, 11, 23, 24, 92; 210/638, 263, 266, 502.1, 660; 202/180
See application file for complete search history.

(56) References Cited

U.S. PATENT DOCUMENTS

| | | | | |
|---|---|---|---|---|
| 3,305,456 A | | 2/1967 | Broughton | |
| 3,410,794 A | * | 11/1968 | Li ................................. | 208/308 |
| 3,640,850 A | * | 2/1972 | Smith, Jr. ...................... | 203/11 |

(Continued)

FOREIGN PATENT DOCUMENTS

| | | |
|---|---|---|
| EP | 1 985 588 A1 | 10/2008 |
| GB | 1 363 449 | 8/1974 |

(Continued)

OTHER PUBLICATIONS

Salagar et al., 2002, Surfactants Types and Uses.*

(Continued)

*Primary Examiner* — Allison Fitzsimmons
(74) *Attorney, Agent, or Firm* — Oliff PLC

(57) ABSTRACT

A unit for pretreating water by heat and/or ion treatment. It provides a pretreatment unit including a direct contact heat and/or ion exchanger having a continuous or dispersed phase that includes a fluorinated liquid that is not miscible with water with a density of more than 1.25.

20 Claims, 5 Drawing Sheets

(56) References Cited

U.S. PATENT DOCUMENTS

| | | | |
|---|---|---|---|
| 3,731,801 A * | 5/1973 | Hess | C02F 1/042 |
| | | | 159/DIG. 17 |
| 4,238,296 A | 12/1980 | Sadhukhan | |
| 4,793,931 A * | 12/1988 | Stevens et al. | 210/636 |
| 7,132,051 B2 * | 11/2006 | Marchionni et al. | 210/634 |

FOREIGN PATENT DOCUMENTS

| | | | |
|---|---|---|---|
| JP | H0791866 A | 4/1995 | |
| WO | WO 2005060434 A2 * | 7/2005 | C07C 43/126 |
| WO | WO 2008021123 A1 * | 2/2008 | B01F 17/0035 |

OTHER PUBLICATIONS

Chemical Book CAS report for Dichloromonofluoromethane, 2007.*

Inaba et al. (2008).*

Young, 1967, pp. 82-85, Stanford Research Institute, Menlo Park, California.*

Hagiwara et al.; "Interaction between near-wall turbulence structure and immiscible droplets falling with wobbling motion in upward water flow;" *Energy*; 2005; pp. 181-195; vol. 30.

International Search Report dated Jun. 9, 2010 in International Application No. PCT/FR2010/050169.

* cited by examiner

WATER PRETREATMENT UNIT USING A FLUORINATED LIQUID

The present invention relates to a unit for the pretreatment of water, in particular saline water, especially by heat and/or ion treatment.

Because fresh water is becoming scarcer and scarcer, processes for desalinating saline water (sea water, brackish water, brine) are becoming ever more sought-after. However, the cost associated with such processes remains high, along with their environmental impact. Existing processes frequently use even more expensive technologies (physical, chemical, biological and/or membrane processes). One solution for improving such technologies would be to significantly increase the degree of conversion of saline water to fresh water. However, today's processes for the pretreatment of saline water, in particular sea water, cannot currently increase said degree of conversion beyond 50% due to the presence of scaling salts. The term "degree of conversion of saline water to fresh water" means the fraction of fresh water produced per treated unit of saline water. Increasing said degree of conversion would allow the following:
- an increase in the relative production of fresh water;
- a reduction in the relative quantity of saline water to be pretreated;
- a reduction in the size of the desalination units;
- a reduction in the energy consumption linked to desalination; and
- a reduction in the quantity of brine produced by increasing the quantity of salt in the effluent to allow the effluent to be treated more cheaply; and a reduction in environmental impact due to lower heat and/or chemical pollution.

Said impossibility of increasing the degree of conversion is principally due to problems with scaling linked to calcium and magnesium salts. Some of said salts have low solubility and others have reverse solubility: they precipitate out as soon as the temperature is too high. Further, for sea water, salts such as $CaCO_3$, $Mg(OH)_2$, or $CaSO_4$ precipitate at ambient temperature as soon as the degree of conversion reaches 50% plus, this representing a critical stage (where the concentration of salt of the concentrate is double that of the supply flow). Scaling of the equipment generates a reduction in the flow section, a reduction in the heat transfer coefficients of the exchangers, and/or blocking of the pores of the membranes.

In order to combat that scaling, various treatments have been proposed:
- decarbonization using lime $Ca(OH)_2$: that pretreatment process suffers from disadvantages inherent to handling and using lime. Further, twice as much $CaCO_3$ salt is precipitated, and so the volume of sludge to be treated is also multiplied by two. That process is unsatisfactory in that it also generates magnesium carbonate, which is difficult to eliminate, and it frequently has to be completed by adding other chemicals such as $Na_2CO_3$, in order to cause the other ions present in the water to be treated to precipitate out;
- acid decarbonization: as above, that technique suffers from disadvantages relating to the manipulation and regular addition of strong acids ($H_2SO_4$, HCl, etc). Further, it requires the use of a corrosion inhibitor, thereby adding to the costs and chemical pollution;
- seeding: that technique is intended to cause scale to be deposited on crystalline seeds that have been introduced into the water to be treated. It incurs risks of solidification during stoppages, which probably explains its lack of development;
- resin softening: with that technology, calcium ions, $Ca^{2+}$, and $Mg^{2+}$ are replaced using ion exchange resins, those resins subsequently being regenerated. The disadvantages of that process are its use in a cycle that is generally discontinuous, low resin binding and regeneration yields and high installation costs;
- the use of descaling products: that technique, which is the most widespread, consists in injecting very low doses (a few ppm [parts per million]) of polyphosphates, organophosphates, or carboxylic polymers in order to avoid or to minimize scale deposits. It suffers from disadvantages due to handling and dosing descaling compositions as well as their low resistance to temperatures above 70° C. Further, those compositions can increase fouling by bio-organisms and cannot significantly increase the degree of water conversion.

In order to combat fouling phenomena, clarification and filtration solutions also exist. The term "fouling" means the gelatinous accumulation of sludge on the walls of a conduit, resulting from the biological activity of organisms present in the water. Those solutions generally consist in using sand filters, multiple tube filters, ultrafiltration or microfiltration, coagulation and flocculation, decantation and shock chlorination oxidation treatment.

Finally, in order to combat the corrosion resulting from the presence of dissolved dioxygen and carbon dioxide, from a high chloride ion content, from a high water conductivity, or from pollution, various techniques may be used, including the use of a deaerator, acid decarbonization ($H_2SO_4$, HCl), the use of stainless steels as the metals in high pressure circuits, and the use of chemical anti-foaming agents.

All of those solutions require the use of chemicals that are problematic as regards handling and treatment before discharge into the environment. Further, the costs generated are considerable.

Thus, the invention provides a pretreatment unit that can provide a significant increase in the degree of conversion of water to be treated into fresh water by using a direct contact exchanger for extracting certain ions and/or for the controlled precipitation of certain salts of light metals (alkali metals or alkaline-earth metals, beryllium, aluminum, magnesium) in the carbonate (or sulfate) form to prevent the precipitation of scale, while minimizing the use of the usual chemical reagents.

A direct contact exchanger constitutes an industrial device ensuring transfer between two fluids in the absence of a physical wall separating the two fluids. Said transfer may in particular be of heat (direct contact heat exchanger) and/or of ions (direct contact ion exchanger). In practice, the direct contact heat and/or ion exchanger is intended to carry out heat and/or ion transfer between a fluorinated phase and the water to be treated. The term "water to be treated" means saline water (sea water, brackish water, brine) and effluent (water having pollution and mineral or biological impurities that result directly or indirectly from human activity). Advantageously, the exchanger of the invention is particularly suitable to the treatment of water polluted by hydrocarbons. An exchanger comprises a column, for example.

More particularly, in accordance with the invention, a unit is provided for the pretreatment of water, in particular saline water, the unit comprising a direct contact exchanger in which the continuous or dispersed fluorinated phase comprises a fluorinated liquid that is not miscible with water with a density of more than 1.25. Preferably, the direct contact exchanger is a heat exchanger and/or ion exchanger. Depending on the fluorinated phase used, the transfer carried out between the fluorinated phase and the water to be treated could be heat transfer, or ion transfer, or heat and ion transfer simultaneously.

The fluorinated liquid that is not miscible with water is hydrophobic, for example.

The pretreatment unit of the invention can be used to substantially improve the degree of conversion to fresh water in desalination processes by means of the use of a thermal pretreatment that is particularly efficient, at least in part replacing a chemical pretreatment.

Using a direct contact heat exchanger means that the temperature of the water to be treated can be raised sufficiently to ensure:
- natural degassing of that water to remove non-condensable gas such as dioxygen, dinitrogen, or carbon dioxide;
- precipitation of reverse solubility salts of the $CaCO_3$, $Mg(OH)_2$, $CaSO_4$ type;
- precipitation of salts with low solubility at said temperatures, such as $CaF_2$, $BaSO_4$, $SrSO_4$;
- death of aerobic or anaerobic micro-organisms by means of a sufficient residence time at too high a temperature to be able to maintain biological functions; and
- evaporation of dissolved volatile organic compounds.

The consequence of these phenomena is to avoid problems with corrosion due to the presence of corrosive gases such as dioxygen or carbon dioxide, to avoid fouling, and above all to precipitate salts concerned with carbonate hardness in a step of the process in which said precipitation is without consequences for the device.

In particular, this pretreatment unit can be used to allow downstream processes operating at a higher temperature, such as multiple distillation (MED), multistage flash distillation (MSF) or membrane distillation, to be carried out with improved productivity and energy efficiency. Such processes combined with the pretreatment unit of the invention open the door to degrees of conversion exceeding 50% and possibly up to 90%.

Further, the combination of the high density of said fluorinated fluids that are not miscible with water with the specific interfacial tension between the fluorinated heat exchange liquids and the water to be treated means that the precipitated salts can float at the interface between said two phases. Thus, said salts can readily be recovered at the exchanger or the crystallization tank.

The use of an ion exchanger means that in the event of pretreating water laden with ions (when the direct contact ion exchanger is an absorption exchanger), ions can be exchanged from the water to be treated laden with ions to the fluorinated phase. Thus, the pretreated water is softened and/or desalinated as a function of the ions exchanged or extracted from the water to be treated into the fluorinated phase.

Using an ion exchanger also means that when regenerating a fluorinated phase laden with ions (when the direct contact ion exchanger is a regeneration exchanger), ions can be exchanged from the fluorinated phase laden with ions to the regeneration water. Thus, the fluorinated phase is depleted in its ions and may be re-used to act as the fluorinated phase for the pretreatment of water laden with ions.

Advantageously, the fluorinated liquid that is not miscible with water is defined by a ratio m/p equal to a real number equal to 1 or less, with "m" being the number of hydrogen atoms and "p" being the number of fluorine atoms contained in the fluorinated liquid that is not miscible with water.

Preferably, the fluorinated liquid that is not miscible with water of the fluorinated phase is a compound with empirical formula $C_nH_mF_pN_qO_xS_y$, wherein:

C, H, F, N, O, S respectively represent a carbon, hydrogen, fluorine, nitrogen, oxygen, and sulfur atom;

$\underline{n}$ is an integer in the range 3 to 25, preferably in the range 3 to 12, limits included;

$\underline{m}$ is an integer in the range 0 to 27, preferably in the range 0 to 20, limits included;

$\underline{p}$ is an integer in the range 5 to 54, preferably in the range 5 to 27, limits included;

$\underline{q}$ is an integer in the range 0 to 6, preferably in the range 0 to 3, limits included; and $\underline{x}$ is an integer in the range 0 to 10, preferably in the range 0 to 7, limits included; and $\underline{y}$ is an integer in the range 0 to 6, preferably in the range 0 to 3, limits included.

In particular, the invention is aimed at liquids belonging to one of the following families: perfluorinated (PFC) or hydrofluorinated (HFC) liquids and their derivatives and ionic liquids.

More particularly, the invention is aimed at perfluoroethers (PFE), hydrofluoroethers (HFE), perfluoropolyethers (PFPE), hydrofluoropolyethers (HFPE), perfluorinated amines (PFA), preferably ternary (PFTA), hydrofluorinated amines (HFA), preferably ternary (HFTA), perfluorinated polyamines (PFPA), hydrofluorinated polyamines (HFPA), perfluorothioethers (PFTE), hydrofluorothioethers (HFTE), perfluoropolythioethers (PFPTE), hydrofluoropolythioethers (HFPTE), hydrofluorothioetheramines (HFTEA), perfluoro-azacyclohexanes, perfluoroetheramines, hydrofluoroetheramines (HFEA), perfluorothioetheramines, perfluoroethylene alcohols, perfluorocyclohexanes, hydrofluorocyclohexanes, perfluorodecalins, perfluorocycloethers, hydrofluorocycloethers, perfluorocyclothioethers, hydrofluorocyclothioethers and hydrophobic ionic liquids that may be based on bis(trifluoromethylsulfonyl)imide ions ($TF2N^-$).

Said perfluorinated or hydrofluorinated molecules may have a straight or branched carbon chain. Preferably, said molecules have a straight carbon chain in order to promote a maximum boiling point and minimize miscibility with water. Advantageously, any hydrogen atoms are preferably placed on the acid or amine functions or, as a default, on a carbon chain containing one or two carbon atoms.

Using such a heat exchange liquid means that there is maximum heat transfer with the water to be treated. Further, said fluids are both non-toxic, non-flammable, inert, ozone layer-friendly, non-polar or slightly polar, colorless and odorless, or even non-bioaccumlative and biodegradable.

The term "perfluorocarbons" means compounds with the empirical formula $C_nF_p$, in which C, $\underline{n}$, F and $\underline{p}$ are as defined above.

More particularly, the term "perfluorocarbon derivatives" means perfluorocarbon compounds substituted with at least one heteroatom selected from nitrogen, oxygen and/or sulfur. Thus, they are compounds with empirical formulae $C_nF_pN_q$, $C_nF_pO_x$, $C_nF_pS_y$, $C_nF_pN_qO_x$, $C_nF_pO_xS_y$, $C_nF_pN_qS_y$, $C_nF_pN_qO_xS_y$, in which C, F, N, O, S, $\underline{n}$, $\underline{p}$, $\underline{q}$, $\underline{x}$, $\underline{y}$ are as defined above. More preferably, they are perfluorocyclohexanes, perfluorodecalins, perfluoro-alkylamines, -dialkylamines or -trialkylamines, perfluoroethers, perfluorocycloethers, perfluoropolyethers, perfluorothioethers, or perfluoropolythioethers.

Preferably, the liquid of the fluorinated phase is selected from hydrofluorinated liquids (or hydrofluorocarbons) for their relatively low environmental impact, especially as regards their participation in global warming phenomena.

The term "hydrofluorocarbons" means compounds with empirical formula $C_nH_mF_p$, in which C, H, F, $\underline{n}$, $\underline{m}$ and $\underline{p}$ are as defined above.

Preferably, the liquid of the fluorinated phase comprises a hydrofluorocarbon compound or derivative.

The term "hydrofluorocarbon derivatives" means hydrofluorocarbon compounds comprising at least one heteroatom selected from nitrogen, oxygen, and/or sulfur. More particularly, they are compounds with empirical formulae $C_nH_mF_pN_q$, $C_nH_mF_pO_x$, $C_nH_mF_pS_y$, $C_nH_mF_pO_xS_y$, $C_nH_mF_pN_qS_y$, $C_nH_mF_pN_qO_x$ and $C_nH_mF_pN_qO_xS_y$, in which C, H, F, N, O, S and $\underline{n}$, $\underline{m}$, $\underline{p}$, $\underline{q}$, $\underline{x}$, $\underline{y}$ are as defined above. Preferably, said compounds are hydrofluorocyclohexane, hydrofluorodecalins, hydrofluoroethers, hydrofluorocycloethers, hydrofluoropolyethers, hydrofluorothioethers, hydrofluoropolythioethers, hydrofluoroalkylamines, hydrofluorodialkylamines, hydrofluoropolyalkylamines, hydrofluorohydrazines, hydrofluorothioetheralkylamines, hydrofluoroetheramines, hydrofluoroetherpolyamines and ionic liquids.

Preferably, perfluorocarbons and hydrofluorocarbons that are saturated as regards hydrogen and fluorine are selected. Preferably, the compounds are selected such that for $\underline{m}$, $\underline{p}$, $\underline{n}$ and $\underline{q}$ as defined above:

m+p=2n+q+2, for compounds comprising no cycle;

m+p=2n+q, for compounds comprising a cycle or a double bond with oxygen or sulfur; and m+p=2n+q, for compounds comprising two cycles or two double bonds with oxygen or sulfur, or one cycle and one double bond with oxygen or sulfur.

Preferred compounds in accordance with the invention are described in particular in Table 1 of Example 1 below ("hydrophobic fluorinated liquid").

In one embodiment, the exchanger is an ion exchanger wherein the fluorinated phase further comprises a fluorinated ion exchange liquid comprising one or more ionic and/or non-ionic fluorinated surfactant(s). Preferably, the fluorinated ion exchange liquid is constituted by one or more ionic and/or non-ionic fluorinated surfactant(s). In this embodiment, the fluorinated liquid that is not miscible with water is used principally for its function as a solvent but not for its heat exchange function. The fluorinated phase is then in the continuous or dispersed form.

In another embodiment, the exchanger is an exchanger for ions and heat, i.e. a heat and ion exchanger. The fluorinated liquid that is not miscible with water is then used for its heat exchange and solvent function. Under such circumstances, the fluorinated phase is in a continuous form.

A non-ionic fluorinated surfactant can simultaneously carry out an ion exchange function and a function of limiting the coalescence of water droplets in the fluorinated phase. When the fluorinated phase comprises a plurality of non-ionic fluorinated surfactants, each non-ionic fluorinated surfactant can simultaneously carry out a function of ion exchange and of limiting the coalescence of water droplets in the fluorinated phase. A non-ionic fluorinated surfactant can solely fulfill the function of ion exchange or a function of limiting the coalescence of water droplets in the fluorinated phase. When the fluorinated phase comprises a plurality of non-ionic fluorinated surfactants, each non-ionic fluorinated surfactant can carry out solely an ion exchange function or a function of limiting the coalescence of water droplets in the fluorinated phase. Finally, one or more non-ionic surfactants can carry out solely a function of ion exchange or a function of limiting the coalescence of water droplets in the fluorinated phase while one or more non-ionic surfactants can simultaneously carry out a function of ion exchange and a function of limiting the coalescence of water droplets in the fluorinated phase.

When ions in the water to be treated are subject to pretreatment (for example by absorption), the ionic and/or non-ionic fluorinated surfactant carries out an exchange or ion extraction function, i.e. exchange or extraction of ions from the water to be treated into the fluorinated phase. In contrast, when a fluorinated phase laden with ions is subject to regeneration, the fluorinated phase laden with ions deriving, for example, from the treatment of ions in water to be treated, the ionic and/or non-ionic fluorinated surfactant carries out a function of ion exchange or extraction from the fluorinated phase laden with ions to the regeneration water in order to regenerate the fluorinated phase.

In a preferred embodiment, the fluorinated phase comprises 0.5% to 30% by volume of ionic fluorinated surfactants and/or non-ionic fluorinated surfactants, preferably 1% to 5%, limits included, of ionic fluorinated surfactants and/or non-ionic fluorinated surfactants.

Preferably, the fluorinated ion exchange liquid comprises an anionic fluorinated exchange liquid (or surfactant) (AFEL) and/or a cationic fluorinated exchange liquid (or surfactant) (CFEL). In a variation, the fluorinated ion exchange liquid comprises a plurality of AFELs and/or CFELs. Such compounds may, for example, be selected from perfluorinated carboxylate salts (perfluorocarboxylate), hydrofluorinated carboxylate salts, perfluorinated alkoxide salts (perfluoroalkoxide), hydrofluorinated alkoxide salts, perfluorinated dialkoxide salts (perfluorodialkoxide), hydrofluorinated dialkoxide salts, perfluorinated carboximidate salts (perfluorocarboximidate), hydrofluorinated carboximidate salts, perfluorinated sulfonate salts (perfluorosulfonates), hydrofluorinated sulfonate salts, perfluorinated sulfate salts (perfluorosulfates), hydrofluorinated sulfate salts, perfluorinated ethersulfonate salts (perfluoroethersulfonates), hydrofluorinated sulfonate ether salts, perfluorinated alkylammonium salts (perfluoroalkylammonium), hydrofluorinated alkylammonium salts, perfluorinated dialkylimidazolium salts (perfluorodialkylimidazolium), hydrofluorinated dialkylimidazolium salts, perfluorinated alkylphosphonium salts (perfluoroalkylphosphonium), hydrofluorinated alkylphosphonium salts, perfluorinated dialkyloxazolidinium salts (perfluorodialkyloxazolidinium), hydrofluorinated dialkyloxazolidinium salts, perfluorinated dialkyl-1-aza-3,5-dioxacyclohexane salts (perfluorodialkyl-1-aza-3,5-dioxacyclohexane), hydrofluorinated dialkyl-1-aza-3,5-dioxacyclohexane salts, perfluorinated alkylborate salts (perfluoroborates), hydrofluorinated alkylborate salts, perfluorinated dialkyldiboracyclopentadiene salts (perfluorodialkyldiboracyclopentadiene), hydrofluorinated dialkyldiboracyclopentadienes salts, perfluorinated dialkyloxaboralidinium salts (perflorodialkyloxaboralidinium), hydrofluorinated dialkyloxaboralidinium salts, perfluorinated dialkyl-1-bora-3,5-dioxacyclohexane salts (perfluorodialkyl-1-bora-3,5-dioxacyclohexane), and hydrofluorinated dialkyl-1-bora-3,5-dioxacyclohexane salts. By way of example, Example 3 comprises a list of ionic fluorinated surfactants.

Preferably, the non-ionic fluorinated surfactants are selected from hydrofluorinated or perfluorinated crown ethers, perfluoroaldehydes, hydrofluoroaldehydes, hydrofluoroetheraldehydes, and hydrofluorothioetheraldehydes, examples of which are given in Example 2.

Advantageously, the ionic and/or non-ionic fluorinated surfactant for ion exchange or extraction is defined by a ratio a/b equal to a real number equal to 1 or less, "a" being the number of hydrogen atoms and "b" being the number of fluorine atoms contained in the molecule of the ionic and/or non-ionic fluorinated surfactant. Thus, said fluorinated surfactants have a relatively low flammability and a relatively high solubility in the fluorinated liquid that is not miscible with water of the fluorinated phase, which then acts as a solvent and/or heat exchange liquid.

Preferably:
- the anionic fluorinated exchange liquid comprises a cationic polar head comprising a nitrogen and/or phosphorus and/or oxygen and/or sulfur heteroatom; and
- the cationic fluorinated exchange liquid comprises an anionic polar head comprising a boron and/or aluminum and/or oxygen and/or sulfur heteroatom.

Such anionic and cationic fluorinated exchange liquids can be used to avoid the precipitation of pairs constituted by the fluorinated exchange liquid and the ion extracted from the water to be treated.

FIG. 4 illustrates the phenomenon at the origin of ion exchange. In particular, it represents a water droplet containing at least sodium and calcium ions, immersed in a hydrophobic fluorinated liquid (HFL) in which a few percent of ionic fluorinated surfactants comprising a cationic fluorinated exchange liquid (CFEL) are dissolved. Such an exchange liquid includes a highly fluorinated, hydrophobic chain with a hydrophilic anionic head. Said surfactants with anionic heads will position themselves at the water-HFL interface. During counter-current movement of the water droplet in the HFL, it comes into contact with many molecules of the surfactant with anionic heads that allow an exchange of cations at the water-HFL interface, between said surfactants with anionic heads and water. With pretreatment (for example by absorption) of ions of the water to be treated (when the direct contact ion exchanger is an absorption exchanger), there is, for example, extraction of calcium cations from the water by exchange of cations between the fluorinated phase and the water via said surfactants with anionic heads that are soluble in HFL but not soluble in water. In contrast, with regeneration of a fluorinated phase laden with ions (when the direct contact ion exchanger is a regeneration exchanger), calcium is added to the regeneration water.

The use of a fluorinated phase comprising this type of fluorinated ion exchange liquid can eliminate divalent ($Ca^{2+}$, $Mg^{2+}$, $Sr^{2+}$, $Ba^{2+}$, etc) and trivalent cations as well as metals potentially present in the water to be treated ($Fe^{2+}$, $Mn^{2+}$, $Zn^{2+}$, etc). In particular, the ions responsible for the hardness of the water and the deleterious metals are thus extracted. The following reaction may be provided as an example:

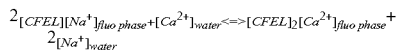

FIG. 5 illustrates the same phenomenon for a water droplet containing at least carbonate ions immersed in the same hydrophobic fluorinated liquid (HFL) in which a few percent of ionic fluorinated surfactants comprising an anionic fluorinated exchange liquid (AFEL) are dissolved. Said exchange liquid comprises a highly fluorinated hydrophobic chain with a cationic hydrophilic head. In the same manner as in FIG. 4, the surfactants with cationic heads position themselves at the water-HFL interface and anion exchange is observed at the water-HFL interface between said surfactants with cationic heads and the water. With pretreatment (for example by absorption) of the ions of the water to be treated (when the direct contact ion exchanger is an absorption exchanger) there is, for example, extraction of carbonate ions from the water by anion exchange between the fluorinated phase and the water via said surfactants with cationic heads that are soluble in the HFL but not soluble in water. In contrast, with regeneration of a fluorinated phase laden with ions (when the direct contact ion exchanger is a regeneration exchanger), carbonate ions are added to the regeneration water.

The use of a fluorinated phase comprising this type of fluorinated ion exchange liquid means that monovalent anions ($NO_3^-$) and divalent anions ($CO_3^{2-}$, $SO_4^{2-}$ etc) primarily responsible for the hardness of water can be eliminated. The following reaction may be provided as an example:

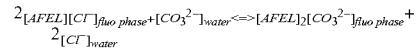

FIG. 6 illustrates ion exchange simultaneously using cationic fluorinated exchange liquids (CFEL) and anionic fluorinated exchange liquids (AFEL). In order to ensure electronic neutrality in the continuous phase, the CFELs and AFELs associate together in ion exchange pairs in the fluorinated phase. These pairs of ion exchangers will position themselves at the water-HFL interface and because of the greater affinity of the CFEL and AFEL respectively for the cations and anions in the water to be treated, they will dissociate and allow exchange at the water-HFL interface between respectively the CFELs and the AFELs and the cations and anions in the water to be treated. With pretreatment (for example by absorption) of ions in the water to be treated (when the direct contact ion exchanger is an absorption exchanger), cations and anions are extracted from the water via said exchanger ions that are soluble in the HFL but insoluble in the water. In contrast, with regeneration of a fluorinated phase laden with ions (when the direct contact ion exchanger is a regeneration exchanger), cations and anions are added to the water.

The use of a fluorinated phase comprising this type of ion exchange liquid means that monovalent, divalent and trivalent cations and anions can be extracted from the water. Examples of reactions that can be used to desalinate and/or reduce the hardness of the water are as follows:

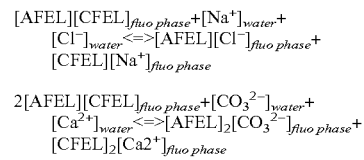

It is also possible to use a non-ionic fluorinated exchange liquid (NIFEL) alone or in combination with one or more AFELs or CFELs. The NIFEL exchanges or extracts ions from the aqueous phase into the fluorinated phase by ion complexation. With a NIFEL, the following reaction can be provided in order to desalinate and/or reduce the hardness of the water:

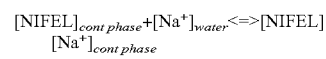

In another embodiment, the exchanger is a heat exchanger in which the fluorinated phase further comprises a non-ionic fluorinated surfactant. Preferably, the fluorinated phase is in the continuous form. The non-ionic fluorinated surfactants can stabilize the biphase mixture constituted by droplets of saline water dispersed in the fluorinated phase and can promote heat exchange while limiting the coalescence of water droplets in the fluorinated phase. A list of non-ionic fluorinated surfactants is given in Table 2 of Example 2.

Advantageously, the non-ionic fluorinated surfactant is defined by a ratio e/f equal to a real number equal to 1 or less with $\underline{e}$ being the number of hydrogen atoms and $\underline{f}$ being the number of fluorine atoms contained in the non-ionic fluorinated surfactant molecule.

Preferably, the continuous fluorinated phase comprises 0.5% to 30% by volume of non-ionic surfactants, preferably 1% to 5%, limits included, of non-ionic surfactants.

Advantageously, the pretreatment unit of the invention comprises a crystallization unit. This crystallization unit may, for example, take the form of a saturation crystallization tank with or without seeding or coagulants and settling.

Preferably, the direct contact heat exchanger of the pretreatment unit of the invention comprises a device for recycling the continuous phase. This recycling device can both save consumables and also save on thermal energy. When the fluorinated phase comprises at least one fluorinated liquid with an ionic head, the recycling device will also comprise a device for regenerating the fluorinated liquid with an ion exchange head. The regeneration device is preferably a direct contact regeneration column employing at least a portion of the treated water or brine deriving from the pretreatment or desalination system for which the reverse reaction has been carried out.

More particularly, the direct contact heat exchanger is composed of two portions: a cooling portion to cool the water to be treated and a heating portion to heat up the water to be treated, the continuous fluorinated phase that is cooled in the heating portion being re-used as the continuous fluorinated phase that is heated up in the cooling portion.

The pretreatment unit of the invention can function in at least two modes:
- a first, "hot", mode, i.e. a collector providing heat to the column operates at temperatures of the order of 80° C. to 200° C. in this first mode, the water to be treated is introduced under pressure at ambient temperature (15° C. to 30° C.) and is heated by exchange of heat with the liquid of the continuous fluorinated phase, said heating allowing the precipitation of salts or movement of equilibria between ions at the water-HFL interface and evacuation of any gases, and then is cooled in order to return to ambient temperature before being sent to the desalination unit; and
- a second, "cold", mode, i.e. the collector providing heat to the column operates at temperatures of the order of −4° C. to 10° C. In this second mode, the water to be treated is introduced at ambient temperature into the exchanger where it is cooled to approach the solidification temperature of saline water below 0° C. It is then sent to the desalination unit operating in the cold (by freezing the water) before being re-injected into the exchanger in order to be heated up by the liquid of the continuous fluorinated phase and being discharged at ambient temperature.

With a direct contact heat exchanger operating at high temperature, the crystallization unit can recover precipitated salts that will float at the interface of the fluorinated phase and the water to be treated.

A process for the pretreatment of water is also proposed that employs a pretreatment unit in accordance with the invention and comprises the following steps:
- introducing a fluorinated phase to an upper end of one of the portions of the exchanger and introducing water to a lower end of one of the portions of the exchanger in order to carry out counter-current heat and/or ion exchange between the ascending water and the descending fluorinated phase; and
- recovering the pretreated water.

Preferably, the process may comprise a step of compression of the water, compression taking place at a predetermined pressure. Further, the water may be introduced under pressure, for example in the form of water droplets.

In one implementation, the process further comprises a step of introducing fluorinated phase in a continuous form and in which the water is introduced in the dispersed form. This process is used with a heat and/or ion exchanger.

More particularly, with an exchanger functioning as a heat exchanger, the process comprises the following steps:
- introducing fluorinated phase in the continuous form to an upper end of a portion of the exchanger and introducing water at ambient temperature in the dispersed form, for example in the form of water droplets, to a lower end of an exchanger portion in order to carry out counter-current heat exchange between the ascending dispersed water and the descending continuous fluorinated phase; and
- sending the water to the crystallization unit.

This process may further comprise the following steps:
- compressing the water to be treated, compression taking place at a predetermined pressure; and
- introducing water, for example under pressure, in the dispersed form to a lower end of the other exchanger portion in order to carry out counter-current heat exchange between the ascending dispersed water and the descending continuous fluorinated phase; and
- recovering water at ambient temperature.

Advantageously, the pressure of the water is in the range 1 to 15 bars absolute ("bar abs").

In another implementation, the process further comprises a step of introducing fluorinated phase in the dispersed form and in which the water is introduced in the continuous form. This process is used with an ion exchanger alone.

Further, when the process employs a pretreatment unit comprising an ion exchanger, the process may further comprise the following steps:
- recovering fluorinated phase obtained at the lower end of a first exchanger, termed the pretreatment exchanger;
- introducing recovered fluorinated phase to an upper end of one of the portions of a second exchanger, termed the regeneration exchanger, of the pretreatment unit;
- introducing regeneration water to a lower end of one of the portions of the regeneration exchanger in order to carry out counter-current ion exchange between the ascending regeneration water and the descending recovered fluorinated phase; and
- recovering regenerated fluorinated phase; and
- introducing regenerated fluorinated phase to an upper portion of the pretreatment exchanger.

The invention also provides a water treatment process comprising a pretreatment process as defined above and further comprising a step of treatment by desalination after the step of recovering pretreated water.

Optionally, the regeneration water at least in part comprises water desalinated during the treatment step.

The invention also provides the use of a direct contact heat and ion exchanger including, as the continuous or dispersed phase, a fluorinated liquid that is not miscible with water with a density of more than 1.25, for the treatment of water and in particular for the pretreatment of saline water.

The invention can be better understood from the following description given solely by way of example and made with reference to the accompanying drawings in which.

Figure 6:
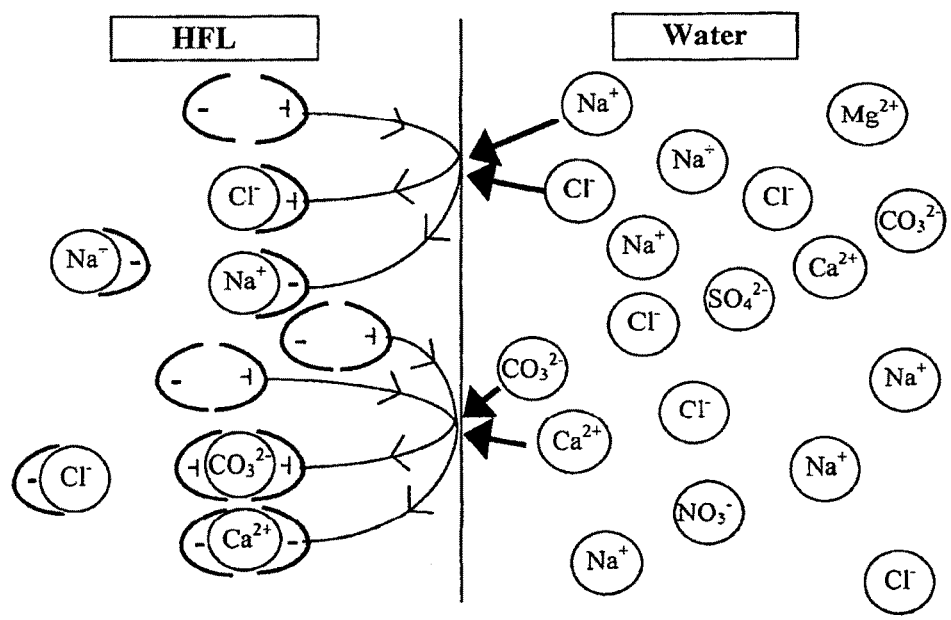
Figure 7:
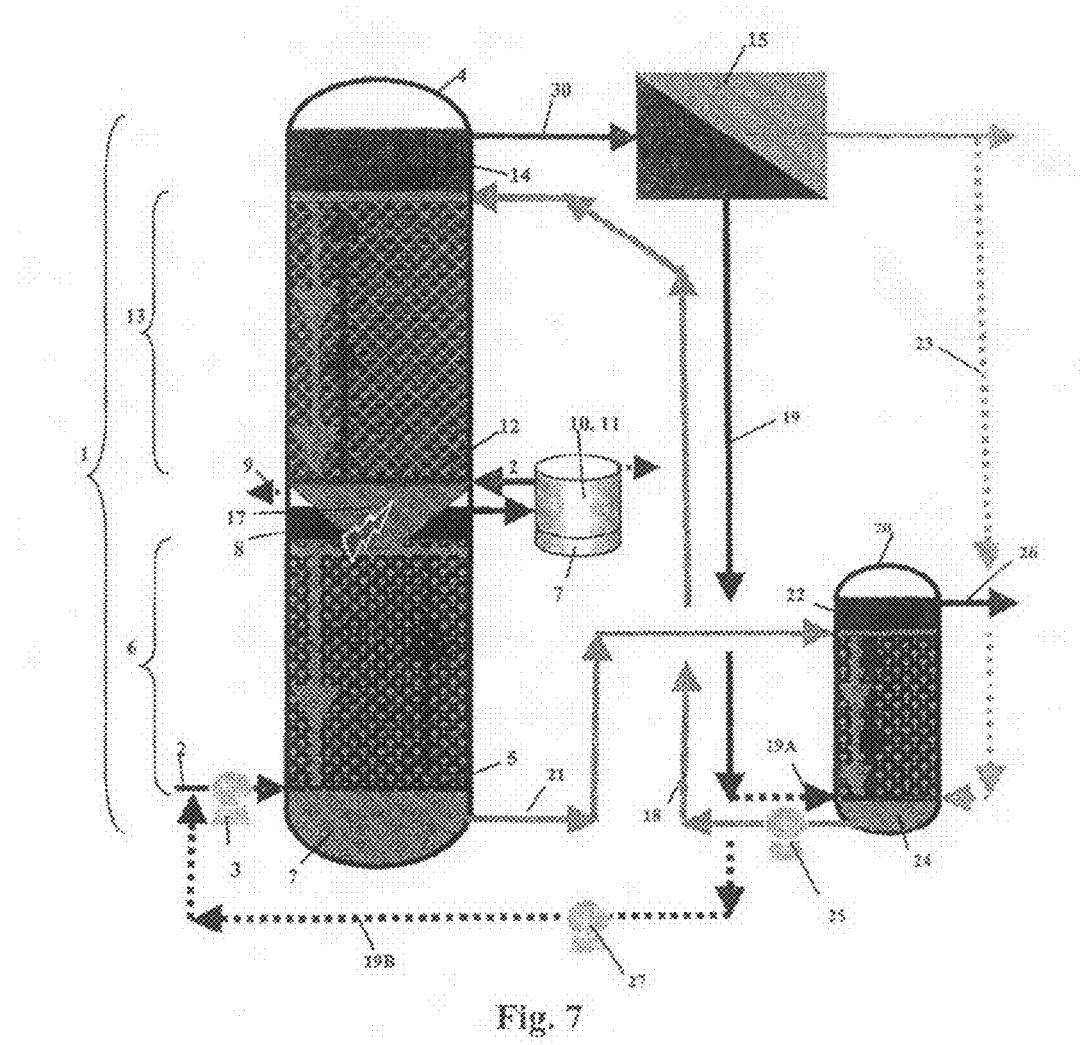

FIG. 6 is a diagram of cation and anion exchange between the fluorinated phase and the water to be treated; and FIG. 7 represents a fourth embodiment in which the direct contact exchanger operates both in heat exchange and in ion exchange mode i.e. at high temperature and with a continuous phase comprising a hydrophobic fluorinated liquid and cationic and anionic surfactants with ion exchange heads.

EXAMPLE 1

Heat Exchange Liquids

TABLE 1

| Name | Semi-developed formula | Mw (g/mol) | Tbp (° C.) | Tmp (° C.) | $\rho$ 25° C. (kg/m$^3$) | Empirical formula |
|---|---|---|---|---|---|---|
| HYDROPHOBIC FLUORINATED LIQUID | | | | | | |
| Water (reminder) | HOH | 18 | 100 | 0 | 997 | $H_2O$ |
| PERFLUROCARBONS | | | | | | |
| PFC—Perfluorooctane | $CF_3(CF_2)_6CF_3$ | 438 | 106 | −25 | 1765 | $C_8F_{18}$ |
| PFC—Perfluorononane | $CF_3(CF_2)_7CF_3$ | 488 | 118 | −16 | 1788 | $C_9F_{20}$ |
| HYDROFLUOROCARBONS | | | | | | |
| HFC - 1,1,1H-Perfluorooctane | $CH_3(CF_2)_6CF_3$ | 384 | 109* | −76* | 1445* | $C_8H_3F_{15}$ |
| HFC - 1,1,1H-Perfluorononane | $CH_3(CF_2)_7CF_3$ | 434 | 121* | −66* | 1475* | $C_9H_3F_{17}$ |
| PERFLUOROCYCLOHEXANES | | | | | | |
| PFCH—Perfluoro-1,3-dimethylcyclohexane | $C_6F_{10}(CF_3)_2$ | 400 | 102 | −55 | 1828 | $C_8F_{16}$ |
| PFCH—Perfluoro-1,3,5-trimethylcyclohexane | $C_6F_9(CF_3)_3$ | 450 | 127 | −68 | 1888 | $C_9F_{18}$ |
| HYDROFLUOROCYCLOHEXANES | | | | | | |
| HFCH - 1,1,1H-Perfluoromethylcyclohexane | $C_6F_{11}(CH_3)$ | 296 | 100* | −88* | 1540* | $C_7H_3F_{11}$ |
| HFCH - 1,1,1H-Perfluoro-1,2-dimethylcyclohexane | $C_6F_{10}(CF_3)(CH_3)$ | 346 | 127* | −63* | 1580* | $C_8H_3F_{13}$ |
| PERFLUORDECALINS | | | | | | |
| PFD—Perfluorodecalin | $C_4F_8 > (CF)_2 < C_4F_8$ | 462 | 142 | −10 | 1930 | $C_{10}F_{18}$ |
| PFMD—Perfluoro(methyldecalin) | $PFD-(CF_3)$ | 512 | 160 | −70 | 1970 | $C_{11}F_{22}$ |
| HYDROFLUORODECALINS | | | | | | |
| HFMD - 1,1,1H-Perfluoro(methyldecalin) | $PFD-(CH_3)$ | 458 | 185* | −77 | 1690* | $C_{11}H_3F_{19}$ |
| PERFLUORODIALKYLAMINE | | | | | | |
| Perfluorobutylpentyl amine | $(C_4F_9)(C_5F_{11})NF$ | 521 | 99* | −45* | 1725* | $C_9F_{21}N$ |
| Perfluorodipentylamine | $(C_5F_{11})_2NF$ | 571 | 115* | −35* | 1755* | $C_{10}F_{23}N$ |
| HYDROFLUORODIALKYLAMINES | | | | | | |
| Methyl-1 perfluoro-propylpentyl amine | $(CH_3—C_3F_6)(C_5F_{11})NF$ | 467 | 113* | −52* | 1575* | $C_9H_3F_{18}N$ |
| Methyl-1 perfluoro-butylpentyl amine | $(CH_3—C_4F_8)(C_5F_{11})NF$ | 517 | 128* | −41* | 1600* | $C_{10}H_3F_{20}N$ |
| PERFLUOROTRIALKYLAMINES | | | | | | |
| Perfluoroethyldipropyl amine | $(C_2F_5)(C_3F_7)_2N$ | 471 | 101 | −65 | 1760 | $C_8F_{19}N$ |
| PFTA—Perfluoro-tripropylamine | $(C_3F_7)_3N$ | 521 | 130 | −52 | 1820 | $C_9F_{21}N$ |
| HYDROFLUOROTRIALKYLAMINES | | | | | | |
| Methyl-1 perfluoro-methyldiethyl amine | $(CH_3CF_2)(C_3F_7)_2N$ | 417 | 98* | −64* | 1550* | $C_8H_3F_{16}N$ |
| Methyl-1 perfluoro-ethyldipropyl amine | $(CH_3C_2F_4)(C_3F_7)_2N$ | 467 | 113* | −52* | 1575* | $C_9H_3F_{18}N$ |
| PERFLUOROAZACYCLOHEXANES | | | | | | |
| Perfluoro-N-methylpiperidine | $_{cycle}(—C_5F_{10}—N—)—(CF_3)$ | 333 | 102* | −50* | 1750* | $C_6F_{13}N$ |
| PERFLUOROETHERS | | | | | | |
| PFE—Perfluorodibutyl | $(C_4F_9)_2O$ | 454 | 102 | −48* | 1860* | $C_8F_{18}O$ |

TABLE 1-continued

HYDROPHOBIC FLUORINATED LIQUID

| Name | Semi-developed formula | Mw (g/mol) | Tbp (°C.) | Tmp (°C.) | ρ 25° C. (kg/m³) | Empirical formula |
|---|---|---|---|---|---|---|
| ether | | | | | | |
| PFE—Perfluorodipentyl ether | $(C_5F_{11})_2O$ | 554 | 129* | −38* | 1925* | $C_{10}F_{22}O$ |
| HYDROFLUOROETHERS | | | | | | |
| HFE - Methyl-Perfluorohexyl ether | $C_6F_{13}$—O—$CH_3$ | 350 | 98 | −38 | 1660 | $C_7H_3F_{13}O$ |
| HFE - 2-trifluoromethyl-3-ethoxydodecofluoro hexane | $C_2H_5$—O—$CF(C_3F_7)CF(CF_3)_2$ | 414 | 128 | −100 | 1614 | $C_9H_5F_{15}O$ |
| PERFLUOROCYCLOETHERS | | | | | | |
| PFCE.Perfluoro-2-butyltetrahydrofuran | $C_4F_9$—FC< ($-C_3F_6-O-$) cycle | 416 | 102 | −88 | 1770 | $C_8F_{16}O$ |
| HYDROFLUOROCYCLOETHERS | | | | | | |
| HFCE.1H,1H,1H-Perfluoro-2-butyltetrahydrofuran | $CH_3$—$C_3F_6$—FC< ($-C_3F_6-O-$) cycle | 362 | 105* | −92* | 1650* | $C_8H_3F_{13}O$ |
| PERFLUOROPOLYETHERS | | | | | | |
| PFPE - Perfluorotriglyme | $CF_3$—$(OC_2F_4)_3$—$OCF_3$ | 502 | 106 | −80* | 1875* | $C_8F_{18}O_4$ |
| PFPE - HT110 | $CF_3$—$((OCFCF_2)$—$CF_3)$—$(OCF_2)_4$—$OCF_3$ | 584 | 110 | −110 | 1710 | $C_9F_{20}O_6$ |
| HYDROFLUOROPOLYETHERS | | | | | | |
| HFPE.1H,1H,1H-Perfluorotriglyme | $CF_3$—$(OC_2F_4)_3$—$OCH_3$ | 448 | 138* | −80* | 1600* | $C_8H_3F_{15}O_4$ |
| HFPE—ZT130 | $HF_2C$—$(OC_2F_4)$—$(OCF_2)_4$—$OCF_2H$ | 498 | 130 | −114 | 1650 | $C_8H_2F_{16}O_6$ |
| PERFLUOROSULFIDES OR PERFLUOROTHIOETHERS | | | | | | |
| PFE—Perfluorodipropyl thioether | $(C_3F_7)_2S$ | 370 | 100* | −71* | 1850* | $C_6F_{14}S$ |
| PFE—Perfluorodibutyl thioether | $(C_4F_9)_2S$ | 470 | 135* | −46* | 1900* | $C_8F_{18}S$ |
| HYDROFLUOROSULFIDES OR HYDROFLUOROTHIOETHERS | | | | | | |
| 1-Methylsulfanyl-PerfluoroPentane | $C_5F_{11}$—S—$CH_3$ | 316 | 109* | −82* | 1530* | $C_6H_3F_{11}S$ |
| 1-Methylsulfanyl-PerfluoroHexane | $C_6F_{13}$—S—$CH_3$ | 366 | 127* | −69* | 1560* | $C_7H_3F_{13}S$ |
| PERFLUOROCYCLOTHIOETHERS | | | | | | |
| Perfluoro-2-methyl-1-thiacyclohexane | $CF_3$—FC< ($-C_4F_8-S-$)$_{cycle}$ | 332 | 104* | −70* | 1700* | $C_6F_{12}S$ |
| IONIC LIQUIDS | | | | | | |
| 1-Ethyl-3-methylimidazolium bis(trifluoromethyl sulfonyl)imide | 1,3-$C_2H_5$—$CH_3$—$_{cycle}(C_3H_3N_2)^+(CF_3SO_2)_2N^-$ | 391 | 417 Dec. | −16 | 1520 | $C_8H_{11}F_6N_3O_4S_2$ |
| 1-Butyl-1-methylpyrrolidinium bis(trifluoromethyl sulfonyl)imide | 1,1-$C_4H_9$—$CH_3$—$_{cycle}(C_4H_8N)^+(CF_3SO_2)_2N^-$ | 422 | >350 | −50 | 1400 | $C_{11}H_{20}F_6N_2O_4S_2$ |
| 1-Butyl-3-methylpyridinium bis(trifluoromethyl sulfonyl)imide | 1,3-$C_4H_9$—$CH_3$—$_{cycle}(C_5H_4N)^+(CF_3SO_2)_2N^-$ | 430 | >350 | 16 | 1400 | $C_{12}H_{16}F_6N_2O_4S_2$ |
| 1-Ethyl-3-methylimidazolium bis(pentafluoroethyl sulfonyl)imide | 1,3-$C_2H_5$—$CH_3$—$_{cycle}(C_3H_3N_2)^+(CF_3CF_2SO_2)_2N^-$ | 491 | >350 | −1 | 1340 | $C_{10}H_{11}F_{10}N_3O_4S_2$ |

*Boiling points, melting points and densities determined by a group analysis process based on more than 600 molecules with known or partially known physical properties.

EXAMPLE 2

Non-Ionic Fluorinated Surfactants

TABLE 2

| Name | Semi-developed formula | Mw (g/mol) | Tbp (° C.) | HLB | ρ 25° C. (kg/m³) | Empirical formula |
|---|---|---|---|---|---|---|
| PERFLUOROALDEHYDE | | | | | | |
| Perfluorooctanal | $C_7F_{15}$—HC=O | 398 | 108* | 1.1 | 1800* | $C_8HF_{15}O$ |
| Perfluorononanal | $C_8F_{17}$—HC=O | 448 | 125* | 0.2 | 1840* | $C_9HF_{17}O$ |
| HYDROFLUOROALDEHYDE | | | | | | |
| 2,2H-perfluoroheptanal | $C_5F_{11}$—$CH_2$—HC=O | 312 | 109* | 2.4 | 1800* | $C_7H_3F_{11}O$ |
| 2,2H-perfluorooctanal | $C_6F_{13}$—$CH_2$—HC=O | 362 | 127* | 1.5 | 1825* | $C_8H_3F_{13}O$ |
| HYDROFLUOROETHERALDEHYDE | | | | | | |
| 2,2H-3-oxy-perfluoro-hexanal | $C_4F_9$—O—$CH_2$—HC=O | 278 | 111* | 4.5 | 1870* | $C_6H_3F_9O_2$ |
| 2,2H-3-oxy-perfluoro-octanal | $C_6F_{13}$—O—$CH_2$—HC=O | 378 | 148* | 2.8 | 1925* | $C_8H_3F_{13}O_2$ |
| HYDROFLUOROTHIOETHERALDEHYDE | | | | | | |
| 2,2H-3-thio-perfluoro-hexanal | $C_4F_9$—S—$CH_2$—HC=O | 294 | 149* | 3.5 | 1900* | $C_6H_3F_9OS$ |
| PERFLUOROALKYLAMINES | | | | | | |
| Perfluorohexylamine | $C_6F_{13}$—$NH_2$ | 335 | 104* | 1.0* | 1730* | $C_6H_2F_{13}N$ |
| Perfluoroheptylamine | $C_7F_{15}$—$NH_2$ | 385 | 121* | 0.8* | 1760* | $C_7H_2F_{15}N$ |
| HYDROFLUOROALKYLAMINES | | | | | | |
| 1,1H-Perfluoro-hexylamine | $C_5F_{11}$—$CH_2$—$NH_2$ | 299 | 124* | 1.1* | 1550* | $C_6H_4F_{11}N$ |
| PERFLUOROALKYLETHERAMINES | | | | | | |
| Perfluorohexyloxyamine | $C_6F_{13}$—O—$NH_2$ | 351 | 102* | 1.8* | 1830* | $C_6H_2F_{13}NO$ |
| HYDROFLUOROEALKYLTHERAMINES | | | | | | |
| 1,1H-Perfluoro-butyloxymethylamine | $C_4F_9$—O—$CH_2$—$NH_2$ | 265 | 126* | 2.4* | 1620* | $C_5H_4F_9NO$ |
| PERFLUOROALKYLTHIOETHERAMINES | | | | | | |
| Perfluorobutyl-thioetheramine | $C_4F_9$—S—$NH_2$ | 267 | 110* | 3.6* | 1530* | $C_4H_2F_9NS$ |
| Perfluoropentyl-thioetheramine | $C_5F_{11}$—S—$NH_2$ | 317 | 128* | 3.0* | 1560* | $C_5H_2F_{11}NS$ |
| PERFLUOROALKYL ETHYLENE ALCOHOL | | | | | | |
| Perfluorobutylether ethylene alcohol | $C_4F_9O$—$CH_2CH_2$—OH | 280 | 176* | 5.8* | 1685* | $C_6H_5F_9O_2$ |
| Perfluoropentylether ethylene alcohol | $C_5F_{11}O$—$CH_2CH_2$—OH | 330 | 195* | 4.9* | 1700* | $C_7H_5F_{11}O_2$ |
| CROWN PERFLUORODIALKYLETHERS | | | | | | |
| Perfluoro dibutane12-crown-4-ether | / | 864 | / | / | / | $C_{16}F_{32}O_4$ |
| Perfluoro dipentane15-crown-5-ether | / | 1080 | / | / | / | $C_{20}F_{40}O_5$ |
| Perfluoro dihexane18-crown-6-ether | / | 1296 | / | / | / | $C_{24}F_{48}O_6$ |
| Perfluoro diheptane21-crown-7-ether | / | 1512 | / | / | / | $C_{28}F_{56}O_7$ |
| CROWN HYDROFLUORODIALKYLETHERS | | | | | | |
| hydrofluoro dihexane18-crown-6-ether | / | 1152 | | | | $C_{16}H_8F_{40}O_6$ |

*Boiling points, melting points and densities determined by a group analysis process based on more than 600 molecules with known or partially known physical properties.
HLB: hydrophilic/lipophilic balance.

EXAMPLE 3

Ionic Fluorinated Surfactants

TABLE 3

| Name | Semi-developed formula | Mw (g/mol) | Tbp (° C.) | Tmp (° C.) | ρ 25° C. (kg/m³) | Empirical formula |
|---|---|---|---|---|---|---|
| IONIC FLUORINATED SURFACTANTS | | | | | | |
| *PERFLUOROALCOHOLS* | | | | | | |
| Perfluoropentanol-1 | $C_5F_{11}$—OH | 286 | 111* | −46* | 1765* | $C_5HF_{11}O$ |
| Perfluorohexanol-1 | $C_6F_{13}$—OH | 336 | 128* | −33* | 1800* | $C_6HF_{13}O$ |
| Perfluorononanol-1 | $C_9F_{19}$—OH | 486 | 174* | 0* | 1885* | $C_9HF_{19}O$ |
| *PERFLUORODIALCOHOLS* | | | | | | |
| Perfluorohexane diol-1,2 | $C_4F_9$—CF< (—OH)(—$CF_2$—OH) | 334 | 182* | −67* | 1890* | $C_6H_2F_{12}O_2$ |
| Perfluorononane diol-1,2 | $C_7F_{15}$—CF< (—OH)(—$CF_2$—OH) | 484 | 233* | −31* | 1975* | $C_9H_2F_{18}O_2$ |
| Perfluoroundecane diol-1,2 | $C_9F_{19}$—CF< (—OH)(—$CF_2$—OH) | 584 | 264* | −11* | 2040* | $C_{11}H_2F_{22}O_2$ |
| *PERFLUOROALKOXIDES* | | | | | | |
| Sodium Perfluorooctanolate-1 | $C_8F_{17}$—$O^-Na^+$ | 458 | / | / | / | $C_8F_{17}ONa$ |
| *PERFLUORODIALKOXIDES* | | | | | | |
| Disodium Perfluorononanolate-1,2 | $C_7F_{15}$—CF< (—$O^-Na^+$)(—$CF_2$—$O^-Na^+$) | 506 | / | / | / | $C_9F_{18}O_2Na_2$ |
| *PERFLUOROALKYL CARBOXYLIC ACIDS* | | | | | | |
| Heptafluorobutanoic acid | $C_3F_7$—COOH | 214 | 121 | −17.5 | 1650 | $C_4HF_7O_2$ |
| Perfluorohexanoic acid | $C_5F_{11}$—COOH | 314 | 157 | 5.6 | 1840* | $C_6HF_{11}O_2$ |
| Perfluorooctanoic acid | $C_7F_{15}$—COOH | 414 | 189 | 30* | 1895* | $C_8HF_{15}O_2$ |
| *PERFLUOROALKYLCARBOXYLATES* | | | | | | |
| Sodium perfluorohexanoate | $C_5F_{11}$—$COO^-Na^+$ | 338 | / | / | / | $C_6F_{11}O_2Na$ |
| *PERFLUORO ALKYL CARBOXIMIDIC ACIDS* | | | | | | |
| Perfluorohexanoimidic acid | $C_5F_{11}$—CNHOH | 313 | / | / | / | $C_6H_2F_{11}NO$ |
| Perfluorooctanoimidic acid | $C_7F_{15}$—CNHOH | 413 | / | / | / | $C_8H_2F_{15}NO$ |
| *PERFLUOROALKYL CARBOXIMIDATES* | | | | | | |
| Disodium perfluorohexanomidate | $C_6F_{13}$—$CN^-Na^+O^-Na^+$ | 407 | / | / | / | $C_7F_{13}NONa_2$ |
| *PERFLUOROETHERALKYL CARBOXYLIC ACIDS* | | | | | | |
| Perfluoro-2-oxa-hexanoic acid | $C_4F_9$—O—COOH | 280 | 150* | −15* | 1670* | $C_5HF_9O_3$ |
| Perfluoro-2-oxa-heptanoic acid | $C_5F_{11}$—O—COOH | 330 | 170* | −5* | 1690* | $C_6HF_{11}O_3$ |
| *PERFLUOROALKYLSULFONIC ACIDS* | | | | | | |
| Perfluoropentylsulfonic acid | $C_5F_{11}$—$SO_3H$ | 350 | / | / | / | $C_5HF_{11}O_3S$ |
| *PERFLUOROALKYL SULFONATES* | | | | | | |
| Sodium perfluoropentyl sulfonate | $C_5F_{11}$—$SO_3^-Na^+$ | 372 | / | / | / | $C_5F_{11}O_3SNa$ |
| *PERFLUOROALKYLSULFURIC ACIDS* | | | | | | |
| Perfluoropentanesulfuric acid | $C_5F_{11}$—O—$SO_3H$ | 366 | / | / | / | $C_5HF_{11}O_4S$ |
| *PERFLUOROALKYL SULFATES* | | | | | | |
| Sodium perfluoropentyl sulfate | $C_5F_{11}$—O—$SO_3^-Na^+$ | 388 | / | / | / | $C_5F_{11}O_4SNa$ |
| *PERFLUOROALKYLETHER SULFONIC ACIDS* | | | | | | |
| Perfluoro-5-oxa-nonanesulfonic acid | $C_4F_9$—O—$C_4F_8$—$SO_3H$ | 516 | / | / | / | $C_8HF_{17}O_4S$ |

TABLE 3-continued

IONIC FLUORINATED SURFACTANTS

| Name | Semi-developed formula | Mw (g/mol) | Tbp (°C.) | Tmp (°C.) | ρ 25° C. (kg/m³) | Empirical formula |
|---|---|---|---|---|---|---|
| PERFLUOROALKYLETHER SULFONATES | | | | | | |
| Sodium perfluoro-5-oxa-nonanesulfonate | $C_4F_9-O-C_4F_8-SO_3^-Na^+$ | 538 | / | / | / | $C_8F_{17}O_4SNa$ |
| HYDROFLUORODIALKYLAMMONIUM SALTS | | | | | | |
| Methyl tri-(1H,1H,2H,2H-perfluoroheptyl)ammonium chloride | $CH_3-N^+Cl^- < (-((CH_2)_2(CF_2)_5F))_3$ | 988 | / | <20 | / | $C_{22}H_{15}F_{33}NCl$ |
| Methyl tri-(1H,1H,2H,2H,3H,3H-perfluoroheptyl)ammonium chloride | $CH_3-N^+Cl^- < (-((CH_2)_3(CF_2)_4)F)_3$ | 874 | / | <20 | / | $C_{22}H_{21}F_{27}NCl$ |
| Methyl tri-(1H,1H-perfluorohexyl)ammonium chloride | $CH_3-N^+Cl^- < (-(CH_2(CF_2)_5F))_3$ | 946 | / | <20 | / | $C_{19}H_9F_{33}NCl$ |
| Methyl tri-(1H,1H,2H,2H-perfluorohexyl)ammonium chloride | $CH_3-N^+Cl^- < (-((CH_2)_2(CF_2)_4))_3$ | 832 | / | <20 | / | $C_{19}H_{15}F_{27}NCl$ |
| Methyl triperfluoropentyl ammonium chloride | $CH_3-N^+Cl^- < (-((CF_2)_5F))_3$ | 904 | / | <20 | / | $C_{16}H_3F_{33}NCl$ |
| Methyl tri-(1H,1H-perfluoropentyl)ammonium chloride | $CH_3-N^+Cl^- < (-(CH_2(CF_2)_4F))_3$ | 790 | / | <20 | / | $C_{16}H_9F_{27}NCl$ |
| HYDROFLUOROALKYLIMIDAZOLIUM SALTS | | | | | | |
| 1-Methyl-3-perfluorohexyl-imidazolium chloride | $F(CF_2)_6-_{cycle}(C_3H_3N_2)^+Cl^--CH_3$ | 449 | / | <−25 | / | $C_{10}H_6F_{13}N_2C^-$ |
| Perfluoro-1-methyl-3-(1H,1H-perfluorohexyl)imidazolium chloride | $F(CF_2)_5(CH_2)-_{cycle}(C_3H_3N_2)^+Cl^--CH_3$ | 411 | / | <−25 | / | $C_{10}H_8F_{11}N_2C^-$ |
| 1-Methyl-3-(1H,1H-perfluoroheptyl)imidazolium chloride | $F(CF_2)_6(CH_2)-_{cycle}(C_3H_3N_2)^+Cl^--CH_3$ | 463 | / | <−25 | / | $C_{11}H_8F_{13}N_2Cl$ |
| 1-Methyl-3-(1H,1H,2H,2H-perfluoroheptyl)imidazolium chloride | $F(CF_2)_5(CH_2)_2-_{cycle}(C_3H_3N_2)^+Cl^--CH_3$ | 425 | / | <−25 | / | $C_{11}H_{10}F_{11}N_2Cl$ |
| 1-Methyl-3-(1H,1H,2H,2H-perfluorooctyl)imidazolium chloride | $F(CF_2)_6(CH_2)_2-_{cycle}(C_3H_3N_2)^+Cl^--CH_3$ | 477 | / | <−25 | / | $C_{12}H_{10}F_{13}N_2Cl$ |
| 1-Methyl-3-(1H,1H,2H,2H,3H,3H-perfluorooctyl)imidazolium chloride | $F(CF_2)_5(CH_2)_3-_{cycle}(C_3H_3N_2)^+Cl^--CH_3$ | 439 | / | <−25 | / | $C_{12}H_{12}F_{11}N_2Cl$ |
| 1-Methyl-3-[2-(2-perfluoromethoxyethoxy)-perfluoroethyl]imidazolium chloride | $CF_3(CF_2CF_2O)_2-_{cycle}(C_3H_3N_2)^+Cl^--CH_3$ | 429 | / | <−25 | / | $C_9H_6O_2F_{11}N_2Cl$ |
| HYDROFLUOROALKYLBORATE SALTS | | | | | | |
| Sodium methyl tri-(1H,1H,2H,2H-perfluoroheptyl)borate | $CH_3-B^-Na^+ < (-((CH_2)_2(CF_2)_5F))_3$ | 973 | / | <20 | / | $C_{22}H_{15}F_{33}BNa$ |
| Sodium methyl tri-(1H,1H,2H,2H,3H,3H-perfluoroheptyl)borate | $CH_3-B^-Na^+ < (-((CH_2)_3(CF_2)_4F))_3$ | 859 | / | <20 | / | $C_{22}H_{21}F_{27}BNa$ |
| Sodium methyl tri-(1H,1H-perfluorohexyl)borate | $CH_3-B^-Na^+ < (-(CH_2(CF_2)_5F))_3$ | 931 | / | <20 | / | $C_{19}H_9F_{33}BNa$ |
| Sodium methyl tri-(1H,1H,2H,2H-perfluorohexyl)borate | $CH_3-B^-Na^+ < (-((CH_2)_2(CF_2)_4F))_3$ | 817 | / | <20 | / | $C_{19}H_{15}F_{27}BNa$ |
| Sodium methyl triperfluoropentylborate | $CH_3-B^-Na^+ < (-((CF_2)_5F))_3$ | 889 | / | <20 | / | $C_{16}H_3F_{33}BNa$ |
| Sodium methyl tri-(1H,1H-perfluoropentyl)borate | $CH_3-B^-Na^+ < (-(CH_2(CF_2)_4F))_3$ | 775 | / | <20 | / | $C_{16}H_9F_{27}BNa$ |
| HYDROFLUORODIALKYLCYCLOPENTADIENE DIBORATE SALTS | | | | | | |
| Sodium 1-methyl-3-perfluorohexyl-1,3-dibora-2,4-cyclopentadiene | $F(CF_2)_6-_{cycle}(C_3H_3B_2)^-Na^+-CH_3$ | 418 | / | <−25 | / | $C_{10}H_6F_{13}B_2Na$ |
| Sodium 1-methyl-3-(1H,1H-perfluorohexyl)-1,3- | $F(CF_2)_5(CH_2)-_{cycle}(C_3H_3B_2)^-Na^+-CH_3$ | 382 | / | <−25 | / | $C_{10}H_8F_{11}B_2Na$ |

TABLE 3-continued

IONIC FLUORINATED SURFACTANTS

| Name | Semi-developed formula | Mw (g/mol) | Tbp (° C.) | Tmp (° C.) | $\rho$ 25° C. (kg/m$^3$) | Empirical formula |
|---|---|---|---|---|---|---|
| dibora-2,4-cyclopentadiene | | | | | | |
| Sodium 1-methyl-3-(1H,1H-perfluoroheptyl)-1,3-dibora-2,4-cyclopentadiene | $F(CF_2)_6(CH_2)$—$_{cycle}(C_3H_3B_2)^-Na^+$—$CH_3$ | 432 | / | <−25 | / | $C_{11}H_8F_{13}B_2Na$ |
| Sodium 1-methyl-3-(1H,1H,2H,2H-perfluoroheptyl)-1,3-dibora-2,4-cyclopentadiene | $F(CF_2)_5(CH_2)_2$—$_{cycle}(C_3H_3B_2)^-Na^+$—$CH_3$ | 394 | / | <−25 | / | $C_{11}H_{10}F_{11}B_2Na$ |
| Sodium 1-methyl-3-(1H,1H,2H,2H-perfluoroctyl)-1,3-dibora-2,4-cyclopentadiene | $F(CF_2)_6(CH_2)_2$—$_{cycle}(C_3H_3B_2)^-Na^+$—$CH_3$ | 446 | / | <−25 | / | $C_{12}H_{10}F_{13}B_2Na$ |
| Sodium 1-methyl-3-(1H,1H,2H,2H,3H,3H-perfluoroctyl)-1,3-dibora-2,4-cyclopentadiene | $F(CF_2)_5(CH_2)_3$—$_{cycle}(C_3H_3B_2)^-Na^+$—$CH_3$ | 396 | / | <−25 | / | $C_{11}H_{12}F_{11}B_2Na$ |
| Sodium 1-methyl-3-[2-(2-perfluoromethoxyethoxy)-perfluoroethyl]-1,3-dibora-2,4-cyclopentadiene | $CF_3(CF_2CF_2O)_2$—$_{cycle}(C_3H_3B_2)^-Na^+$—$CH_3$ | 398 | / | <−25 | / | $C_9H_6O_2F_{11}B_2Na$ |

*Boiling points, melting points and densities determined by a group analysis process based on more than 600 molecules with known or partially known physical properties.

Other ionic fluorinated surfactants described below may also be used with each group R1, R2, R3, R4 selected independently from the following groups: —$((CH_2)_2(CF_2)_5F)$, —$((CH_2)_3(CF_2)_4F)$, —$((CH_2)(CF_2)_5F)$, —$((CH_2)_2(CF_2)_4F)$, —$((CF_2)_5F)$, —$(CH_2(CF_2)_4F)$, —$(CF_2)_6F)$, —$(CF_2)_4F)$, —$((CH_2)(CF_2)_5F)$, —$((CH_2)_2(CF_2)_6F)$, —$((CH_2)_3(CF_2)_5F)$, —$((CH_2)_3(CF_2)_6F)$, —$(CF_2CF_2O)_2CF_3)$, and —$CH_3$.

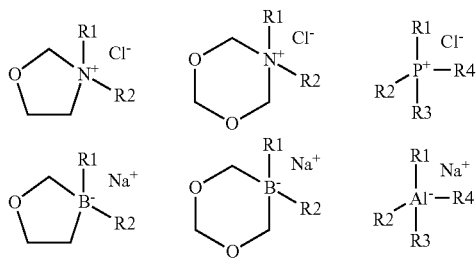

EXAMPLE 4

Direct Contact Heat Exchanger Operating at High Temperature

Figure 1:
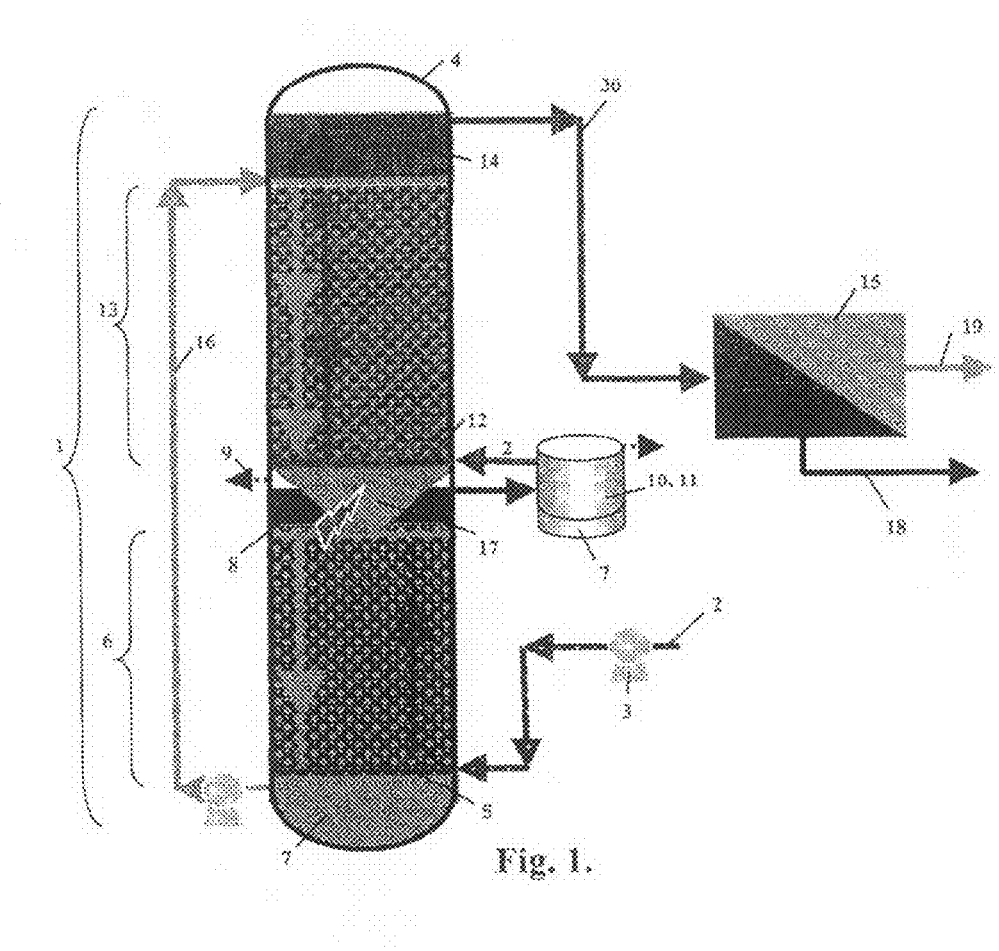
FIG. 1 shows a first embodiment in which the direct contact heat exchanger operates at high temperature.

FIG. 1 shows a first embodiment of the invention in which the direct contact heat exchanger 1 operates at high temperature. The water to be treated 2, here sea water, is compressed by a liquid pump 3 so that the pressure of the water 2 is higher than the barometric pressure of a column 4 at a lower distributor 5, ensuring dispersion of the water 2 into water droplets of homogenous size over the whole of a lower zone 6 of the column 4. Thus, direct contact heat exchange is carried out in the zone 6 with a counter-current zone between the ascending dispersed water 2 which heats up and a descending continuous fluorinated phase 7 which cools down.

On arriving at an upper portion 8 of the lower zone 6, the water 2, which is less dense than the immiscible hydrophobic fluorinated heat exchange liquid 7, separates naturally while the gases 9 initially dissolved in the water 2 are purged. The hot water 2 is at a sufficiently high pressure for it not to boil.

It is then sent to a crystallization unit 10 to allow any reverse solubility salts to crystallize and to allow them to be evacuated in the solid form. The bottom of said crystallization unit 10 comprises a fluorinated heat exchange liquid 7 on which the salt crystals will be deposited, facilitating evacuation of the precipitated solids.

Said crystallization unit 10 is associated with a clarification section 11 allowing the production of clear salt water 2 returned to a second distributor 12 ensuring homogenous dispersion of the clarified salt water 2 over the whole of an upper zone 13 of the column 4. Heat exchange then occurs between the ascending dispersed phase of salt water 2 that cools down and the descending continuous fluorinated phase 7 that heats up. Thus, at the column head 14, cold clarified salt water 2 is produced to supply a desalination unit 15 with a high degree of conversion for the water.

The direct contact heat exchanger 1 is also provided with a system 16 for circulating heat exchange liquid 7 in a closed loop; it is collected, cold and at maximum pressure, from the bottom of the lower zone 6 for recycling to the top of the upper zone 13 and distributed over the whole section of the column 4. Descending as a continuous phase in this column 4, this heated fluorinated heat exchange liquid 7 reaches a collector 17 located at the interface of the lower zone 6 and the upper zone 13, said collector 17 providing the heat for the column 4 and distribution of the continuous fluorinated phase over the whole section of the lower zone 6.

In an example of an application, consider a direct contact exchanger as described above treating 10000 m$^3$/day of sea water containing 36 g/liter of salt, which can change from 25° C. to 123° C. by direct contact with a liquid of a continuous fluorinated phase (heat exchange liquid, HEL) of the perfluorononane type ($C_9F_{20}$-$T_{bp}$=123° C., $T_{mp}$=−16° C.). A summary of the results obtained is given in the two tables below for the lower preheating zone 6 and the upper cooling zone 13 respectively:

| Height of lower zone (TTH) | m | 2.25 |
|---|---|---|
| Mean diameter of column | m | 2.44 |
| Diameter of water droplets | mm | 2 |
| $T_{inlet}/T_{outlet}$, sea water | ° C. | 25/123 |
| $P_{inlet}/P_{outlet}$, sea water | Bar abs | 2.52/2.19 |
| ΔT bottom/Δ T top exchanger | ° C. | 1.0/1.04 |
| ΔT mean, column | ° C. | 2.49 |
| Retention time | / | 17.9% |
| Mean relative velocity | cm/sec | 17.1 |
| Interface area | m$^2$/m$^3$ | 533 |
| Mean coefficient of surface heat exchange | kW/m$^2$/° C. | 3.33 |
| Mean coefficient of volume heat exchange | kW/m$^3$/° C. | 1774 |
| Relative mass flow rate of HEL | / | 3.217 |
| Height of lower zone (TTH) | m | 3.2 |
| Mean diameter of column | m | 2.46 |
| Diameter of water droplets | mm | 2 |
| $T_{inlet}/T_{outlet}$, sea water | ° C. | 120/30 |
| $P_{inlet}/P_{outlet}$, sea water | Bar abs | 2/1.5 |
| ΔT bottom/Δ T top exchanger | ° C. | 2.9/3.9 |
| ΔT mean, column | ° C. | 1.61 |
| Retention time | / | 18% |
| Mean relative velocity | cm/sec | 22.1 |
| Interface area | m$^2$/m$^3$ | 545 |
| Mean coefficient of surface heat exchange | kW/m$^2$/° C. | 3.36 |
| Mean coefficient of volume heat exchange | kW/m$^3$/° C. | 1830 |
| Relative mass flow rate of HEL | / | 3.217 |

"TTH" (total tangential height) is the height of the direct contact exchange zones 6 and 13 respectively in FIG. 1.

In this example, a thermal energy consumption of 7.3 kWh/m$^3$ of salt water was necessary to pretreat the water. Note also that 2 to 5 tonnes per day of salts with reverse solubility had to be evacuated or at least partially re-used to potabilize and re-mineralize the desalinated water.

From a general viewpoint, increasing the degree of conversion of a desalination unit has a direct impact on the desalination costs due to a reduction in the flow rates for treatment and the flow rate of brine produced. Thus, increasing the degree of conversion of water from 50% to 80% means that the flow rate of water to be treated can be reduced by 35% and the flow rate of the brine to be managed by 75%, which means that the unit cost per cubic meter of fresh water produced can be reduced by approximately 15% to 35% by combining the unit described above with current desalination technologies.

EXAMPLE 5

Direct Contact Heat Exchanger Operating at Low Temperature

Figure 2:
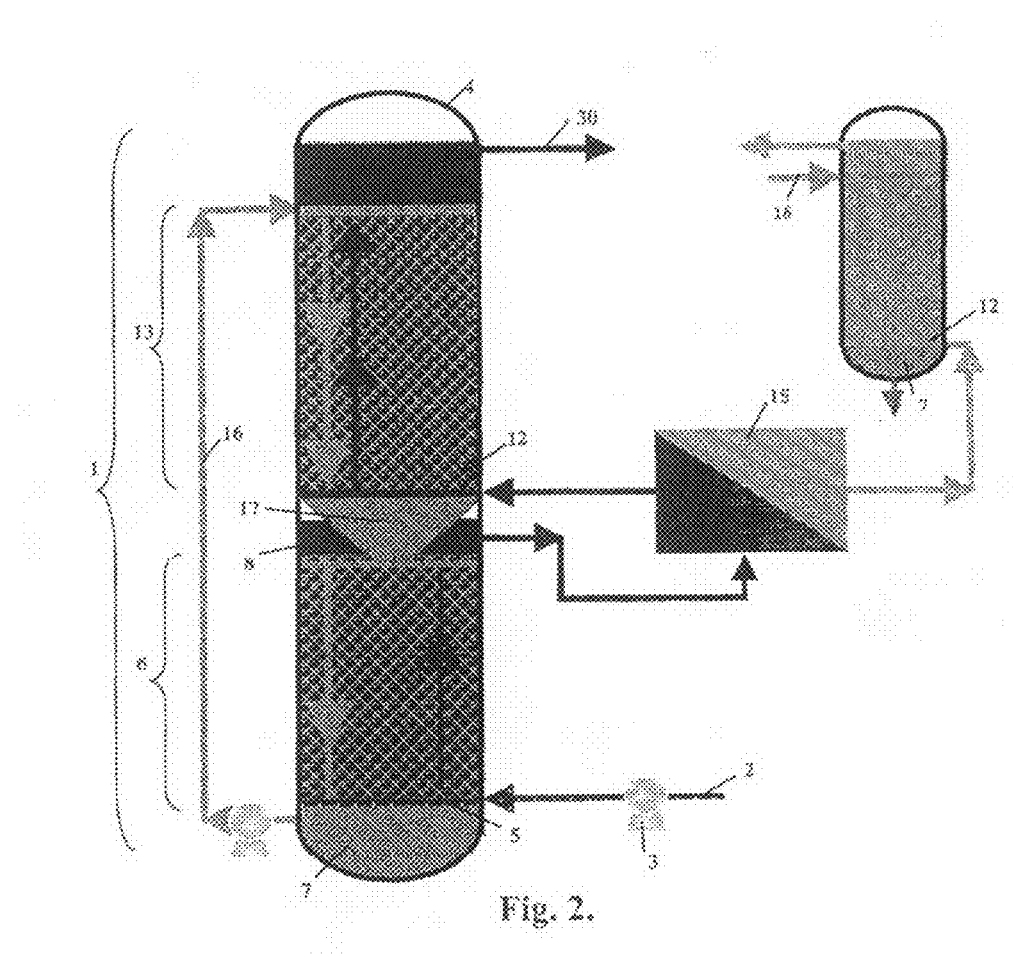
FIG. 2 shows a second embodiment in which the direct contact heat exchanger operates at low temperature.

FIG. 2 shows a second embodiment of the invention in which the direct contact heat exchanger 1 operates at low temperature. The water to be treated 2, here sea water, is compressed by a liquid pump 3 so that the pressure of the water 2 is higher than the barometric pressure of a column 4 at a lower distributor 5, ensuring dispersion of the water 2 into water droplets of homogenous size over the whole lower zone 6 of the column 4. Thus, direct contact heat exchange takes place in the counter-current zone 6 between the ascending dispersed water 2, which cools down, and the descending continuous fluorinated phase 7, which heats up.

On arriving at the upper portion 8 of the lower zone 6, the water 2, being less dense than the immiscible fluorinated heat exchange liquid 7, separates out naturally.

The cold water 2 is then sent to a desalination unit 15 to freeze the water where crystallization and separation of the water to be treated into fresh water and liquid brine is carried out.

The brine or the molten ice crystals from 2 are then sent to a second distributor 12 to produce a homogenous dispersion thereof over the entire upper zone 13 of the column 4. A heat exchange is then carried out between the ascending dispersed phase of fresh water or brine from 2, which heats up, and the descending continuous fluorinated phase 7, which cools down.

At the column head 14, fresh water or brine is recovered as is desired, at ambient temperature.

The direct contact heat exchanger 1 is also provided with a system 16 for circulating the fluorinated heat exchange liquid 7 in a closed loop; it is collected at ambient temperature and at maximum pressure at the bottom of the lower zone 6 for recycling to the top of the upper zone 13 and distributing over the whole section of the column 4. Descending as a continuous phase in said column 4, this cooled fluorinated heat exchange liquid 7 reaches a collector 17 located at the interface of the lower zone 6 and the upper zone 13, said collector 17 ensuring partial thermal cooling of the column 4 and ensuring distribution of the continuous fluorinated phase over the whole section of the lower column 6.

EXAMPLE 6

Figure 3:
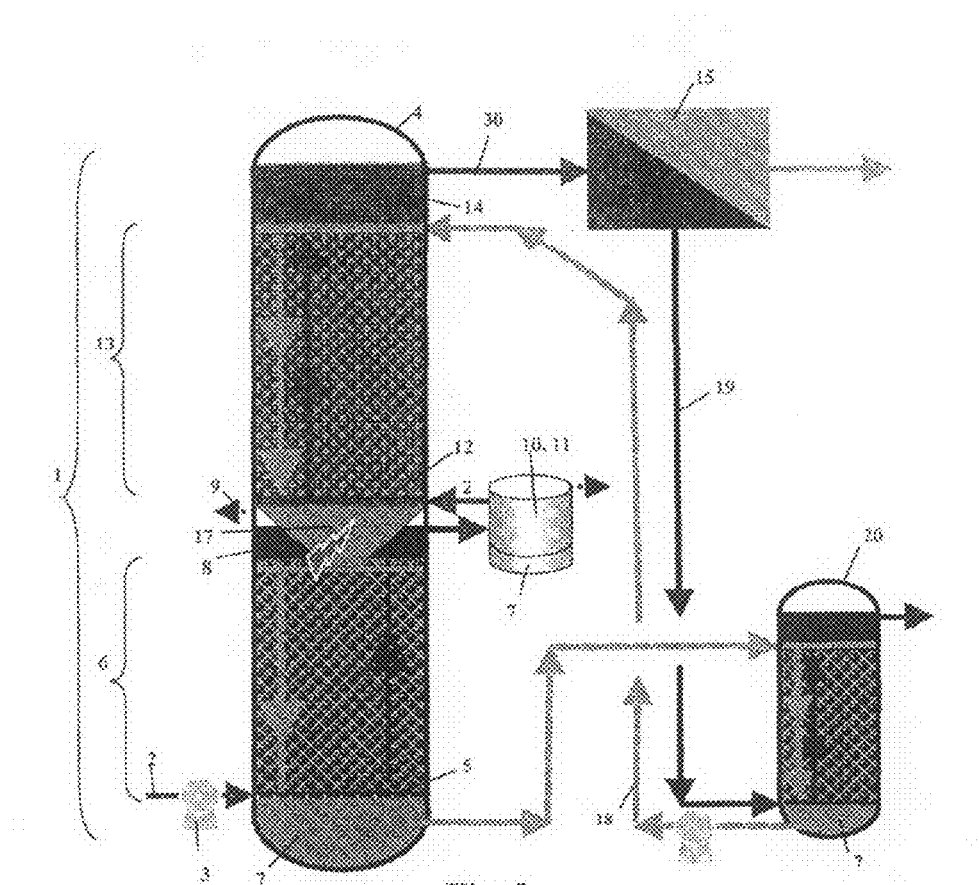
FIG. 3 shows a third embodiment in which the direct contact heat exchanger operates both in heat exchange and ion exchange mode, i.e. at high temperature and with a continuous phase comprising a hydrophobic fluorinated liquid and an ionic surfactant with an ion exchange head.
Figure 4:
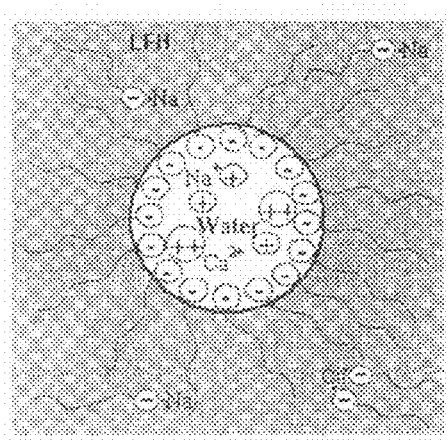
FIG. 4 illustrates the presence of surfactants with anionic heads around a water droplet.
Figure 5:
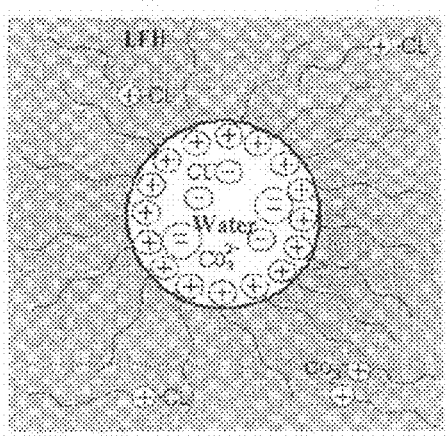
FIG. 5 illustrates the presence of surfactants with cationic heads around a water droplet.

Direct Contact Heat Exchanger Operating at High Temperature with a Continuous Fluorinated Phase Comprising a Hydrophobic Fluorinated Liquid and an Ionic Surfactant with an Ion Exchange Head FIG. 3 illustrates a third embodiment of a unit and a process of the invention in which the direct contact heat and ion exchanger 1 operates at high temperature with a continuous fluorinated phase comprising a hydrophobic fluorinated liquid and an ionic surfactant with an ion exchange head.

The operation of the heat and ion exchanger is identical to that described in Example 4 with just two differences:
  the continuous fluorinated heat exchange phase 7 comprises a mixture of perfluorononane with 2% of ionic fluorinated surfactant of the sodium hydrofluoroalkylcarboxylate type; and
  the recycling device is not only provided with a system 16 for closed loop circulation but also with a column 20 for regenerating surfactant using a counter-current of at least a portion of the brine 19 deriving from the desalination system 15.

Thus, once the ion exchange reaction has been carried out in column 4, the continuous fluorinated phase comprising the fluorinated liquid with an ion exchange head is evacuated to the direct contact regeneration column 20 employing an NaCl-rich brine deriving from the desalination unit 15 in order to carry out a reverse ion exchange reaction. The regenerated continuous fluorinated phase is then sent to the top of the upper zone 13 and distributed over the whole section of the column 4.

This third embodiment means that continuous extraction of multivalent cations can be carried out by cation exchange between liquid-liquid phases, which means that saline water can be softened effectively while minimizing the production of crystallized salts to be evacuated. Further, by working at a temperature of more than 80° C., the ion exchange kinetics are improved while at the same time allowing degassing of dissolved gases and thermal destruction of bio-organisms.

By way of example, the table below gives the composition of standard sea water before and after pretreatment of the water, using the system described in FIG. 3.

| Sea water | | Un-treated mg/L | Pretreated mg/L |
|---|---|---|---|
| Cations | $Na^+$ | 11056 | 13829 |
| | $K^+$ | 418 | 418 |
| | $Ca^{2+}$ | 418 | 0 |
| | $Sr^{2+}$ | 14 | 0 |
| | $Mg^{2+}$ | 1328 | 66 |
| Anions | $HCO3^-$ | 148 | 15 |
| | $SO4^{2-}$ | 2765 | 2765 |
| | $Cl^-$ | 19811 | 19811 |
| | $Br^-$ | 68 | 68 |
| | $B(OH)_3^-$ | 25 | 25 |
| Salinity | | 36065 | 37012 |
| 25° C. | | mg/kg | mg/kg |
| Gas | $O_2$ | 6.8 | 0 |
| | $CO_2$ | 45 | 5 |
| | $N_2$ | 11.1 | 0 |

This system means that a desalination system with a degree of conversion of water much higher than 50% can be used downstream for an overall reduction in desalination costs.

EXAMPLE 7

Direct Contact Heat Exchanger Operating at High Temperature with a Continuous Fluorinated Phase Comprising a Hydrophobic Fluorinated Liquid and a Pair of Ionic Surfactants with Ion Exchange Heads for Water Desalination FIG. 7 illustrates an embodiment of the unit and process of the invention in which the pretreatment direct contact heat and ion exchanger 1 functions at high temperature with a continuous fluorinated phase comprising a hydrophobic fluorinated liquid, here a hydrofluorocarbon, and a pair of cationic and anionic surfactants, here hydrofluoroalkyl ammonium and hydrofluoroalkyl borate salts.

The operation of the heat and ion exchanger of Example 7 is identical to that described in Example 6. The unit and the process of Example 7 comprise the following additional characteristics.

The continuous fluorinated phase laden with ions 21 is recovered from the column bottom at the lower end 5 of the exchanger 1. The treated water 30 is recovered from the upper end 14 of the exchanger 1. A desalination unit 15 employs a step of treatment of the water 2 by desalination after the step of recovery of treated water 30.

The continuous fluorinated phase recovered 21 from exchanger 1 is introduced to the upper end 22 of the regeneration exchanger 20. Regeneration water is introduced to a lower end 24 under pressure in the form of water droplets in order to carry out ion exchange or even heat exchange as a counter-current between the ascending water droplets of the regeneration water and the descending recovered continuous fluorinated phase 21. The regeneration water comprises a portion 19A of brine 19 and/or desalinated water 23 derived from the desalination unit 15 that is supplied with recovered treated water 30 to the upper end 14 of the exchanger 1. A portion 19B of the brine 19 forms a portion of the water 2 to be treated that is introduced in the region of the lower end 5 of the exchanger 1. The portion 19B is sent to the lower end 5 by means of a pump 27.

The ions of the recovered continuous fluorinated phase 21 are exchanged from the recovered continuous fluorinated phase 21 to the regeneration water 19, 23. The regenerated continuous fluorinated phase 18 that is depleted in ions is collected at the lower end 24 and introduced to the upper end 14 of the pretreatment exchanger by means of a pump 25. It then constitutes the descending fluorinated continuous phase 7 of the exchanger 1. The regeneration water laden with ions 26 is recovered from the upper end 22 of the regeneration exchanger 20.

As an example, the table below gives the composition of standard sea water before (water 2) and after (water 30) pretreatment of the water using the system described in FIG. 7.

| Sea water | | Un-treated mg/L | Pretreated mg/L |
|---|---|---|---|
| Cations | $Na^+$ | 11056 | 1658 |
| | $K^+$ | 418 | 12 |
| | $Ca^{2+}$ | 418 | 0 |
| | $Sr^{2+}$ | 14 | 0 |
| | $Mg^{2+}$ | 1328 | 0 |
| Anions | $HCO3^-$ | 148 | 0 |
| | $SO4^{2-}$ | 2765 | 2765 |
| | $Cl^-$ | 19811 | 2571 |
| | $Br^-$ | 68 | 0 |
| | $B(OH)_3^-$ | 25 | 0 |
| Salinity | | 36065 | 4242 |
| 25° C. | | mg/kg | mg/kg |
| Gas | $O_2$ | 6.8 | 0 |
| | $CO_2$ | 45 | 5 |
| | $N_2$ | 11.1 | 0 |

The invention claimed is:

1. A unit for pretreating water by direct contact between a first fluid and a second fluid, the unit comprising a heat and ion exchanger configured to carry out transfer between the first fluid and the second fluid, the heat and ion exchanger being composed of two portions:
   a cooling portion for cooling water to be treated; and
   a heating portion for heating water to be treated,
   wherein the first fluid includes a saline water phase,
   the second fluid includes a continuous fluorinated phase comprising:
      a fluorinated liquid that is not miscible with water, with a density of more than 1.25, the fluorinated liquid having a formula $C_nH_mF_pN_qO_xS_y$,
         where C, H, F, N, O, S respectively represent a carbon, hydrogen, fluorine, nitrogen, oxygen and sulfur atom, n is an integer in the range 3 to 25, limits included, m is an integer in the range 0 to 27, limits included, p is an integer in the range 5 to 54, limits included, q is an integer in the range 0 to 6, limits included, x is an integer in the range 0 to 10, limits included, and y is an integer in the range 0 to 6, limits included, and
      a non-ionic fluorinated ion exchange liquid which is different from the fluorinated liquid and is dissolved in the fluorinated liquid, the non-ionic fluorinated ion exchange liquid selected from the group consisting of 2,2H-3-oxyperfluorohexanal, 2,2H-3-oxyperfluorooctanal, 2,2H-3-thioperfluorohexanal, perfluorohexylamine, perfluoroheptylamine, perfluorohexyloxyamine, perfluorobutylthioetheramine, perfluoropentylthioetheramine, perfluorobutyletherethylene alcohol, and perfluoropentyletherethylene alcohol, and the fluorinated continuous phase that is cooled in the heating portion is re-used as the fluorinated continuous phase that is heated up in the cooling portion.

2. The unit according to claim 1, wherein the fluorinated phase further comprises an ionic fluorinated exchange liquid.

3. The unit according to claim 2, wherein the ionic fluorinated exchange liquid is defined by a ratio a/b equal to a real number equal to 1 or less with "a" being a number of hydrogen atoms and "b" being a number of fluorine atoms contained in the ionic fluorinated exchange liquid.

4. The unit according to claim 1, wherein, in the formula $C_nH_mF_pN_qO_xS_y$, $\underline{n}$ is an integer in the range 3 to 12, limits included, $\underline{m}$ is an integer in the range 0 to 20, limits included, $\underline{p}$ is an integer in the range 5 to 27, limits included, $\underline{q}$ is an integer in the range 0 to 3, limits included, $\underline{x}$ is an integer in the range 0 to 7, limits included, and $\underline{y}$ is an integer in the range 0 to 3, limits included.

5. The unit according to claim 1, wherein the fluorinated liquid that is not miscible with water is defined by a ratio m/p equal to a real number equal to 1 or less with "m" being the number of hydrogen atoms and "p" being the number of fluorine atoms contained in the molecule of the fluorinated liquid that is not miscible with water.

6. The unit according to claim 1, wherein the fluorinated liquid that is not miscible with water is a perfluorocarbon (PFC) or derivative thereof.

7. The unit according to claim 5, wherein the fluorinated liquid that is not miscible with water is a hydrofluorocarbon (HFC) or derivative thereof wherein the ratio m/p is a real number strictly greater than 0 and less than or equal to 1.

8. The unit according to claim 7, wherein the derivative comprises at least one heteroatom selected from nitrogen, oxygen, and sulfur.

9. The unit according to the claim 1, wherein the non-ionic fluorinated ion exchange liquid is defined by a ratio e/f equal to a real number equal to 1 or less with "e" being a number of hydrogen atoms and "f" being a number of fluorine atoms contained in the molecule of the non-ionic fluorinated ion exchange liquid.

10. The unit according to claim 1, the unit further comprising a crystallization unit located at an interface of the cooling and heating portions.

11. The unit according to claim 1, the unit having a continuous fluorinated phase in which the heat and ion exchanger comprises a device for recycling the continuous fluorinated phase.

12. A process for pretreating water employing a pretreatment unit for pretreating water by direct contact between a first fluid and a second fluid, the unit comprising a heat and ion exchanger configured to carry out transfer between the first fluid and the second fluid, the heat and ion exchanger being composed of two portions:
  a cooling portion for cooling water to be treated; and
  a heating portion for heating water to be treated,
  wherein the first fluid includes a saline water phase,
  the second fluid includes a continuous fluorinated phase comprising:
    a fluorinated liquid that is not miscible with water, with a density of more than 1.25, the fluorinated liquid having a formula $C_nH_mF_pN_qO_xS_y$,
      where C, H, F, N, O, S respectively represent a carbon, hydrogen, fluorine, nitrogen, oxygen and sulfur atom, $\underline{n}$ is an integer in the range 3 to 25, limits included, $\underline{m}$ is an integer in the range 0 to 27, limits included, $\underline{p}$ is an integer in the range 5 to 54, limits included, $\underline{q}$ is an integer in the range 0 to 6, limits included, $\underline{x}$ is an integer in the range 0 to 10, limits included, and $\underline{y}$ is an integer in the range 0 to 6, limits included, and
    a non-ionic fluorinated ion exchange liquid which is different from the fluorinated liquid and is dissolved in the fluorinated liquid, the non-ionic fluorinated ion exchange liquid selected from the group consisting of 2,2H-3-oxyperfluorohexanal, 2,2H-3-oxyperfluorooctanal, 2,2H-3-thioperfluorohexanal, perfluorohexylamine, perfluoroheptylamine, perfluorohexyloxyamine, perfluorobutylthioetheramine, perfluoropentylthioetheramine, perfluorobutyletherethylene alcohol, and perfluoropentyletherethylene alcohol, and
  the fluorinated continuous phase that is cooled in the heating portion is re-used as the fluorinated continuous phase that is heated up in the cooling portion, the process comprising:
  introducing the fluorinated phase to an upper end portion of the heat and ion exchanger and introducing the saline water phase to a lower end portion of the heat and ion exchanger in order to carry out counter-current heat and/or ion exchange between the ascending saline water phase and the descending fluorinated phase; and
  recovering pretreated water.

13. The process according to claim 12, wherein the saline water phase is introduced in a dispersed form.

14. The process according to claim 12, further comprising:
  recovering the fluorinated phase obtained at a lower end portion of a first exchanger;
  introducing recovered fluorinated phase to an upper end portion of a second exchanger of the pretreatment unit;
  introducing regeneration water to a lower end portion of the second exchanger in order to carry out counter-current ion exchange between the ascending regeneration water and the descending recovered fluorinated phase;
  recovering regenerated fluorinated phase; and
  introducing regenerated fluorinated phase to an upper portion of the first exchanger,
  wherein the first exchanger is a pretreatment exchanger and the second exchanger is a regeneration exchanger.

15. A process for treating water, the process comprising the pretreatment process according to claim 12 and treatment by desalination after recovering the pretreated water.

16. The process according to claim 15, further comprising:
  recovering the fluorinated phase obtained at a lower end portion of a first exchanger;
  introducing recovered fluorinated phase to an upper end portion of a second exchanger of the pretreatment unit;
  introducing regeneration water to a lower end portion of the second exchanger in order to carry out counter-current ion exchange between the ascending regeneration water and the descending recovered fluorinated phase;
  recovering regenerated fluorinated phase; and
  introducing regenerated fluorinated phase to an upper portion of the first exchanger, wherein the regeneration water comprises at least a portion of the water desalinated during the treatment,
  wherein the first exchanger is a pretreatment exchanger and the second exchanger is a regeneration exchanger.

17. The unit according to claim 2, wherein the ionic fluorinated exchange liquid comprises at least a compound selected from the group consisting of hydrofluorodialkylammonium salts, hydrofluoroalkylimidazolium salts, hydrofluoroalkylborate salts, hydrofluorodialkylcyclopentadiene diborate salts, hydrofluorocarboxylate salts, hydrofluorosulfonate salts, and hydrofluoroaluminium salts and hydrofluorophosphonium salts having the following formula:

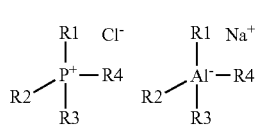

where R1, R2, R3, and R4 are selected independently from the following groups: —$((CH_2)_2(CF_2)_5F)$, —$((CH_2)_3(CF_2)_4F)$, —$((CH_2)(CF_2)_5F)$, —$((CH_2)_2(CF_2)_4F)$, —$((CF_2)_5F)$, —$((CH_2(CF_2)_4F)$, —$((CF_2)_6F)$, —$((CF_2)_4F)$, —$((CH_2)(CF_2)_6F)$, —$((CH_2)_2(CF_2)_6F)$, —$((CH_2)_3(CF_2)_5F)$, —$((CH_2)_3(CF_2)_6F)$, —$((CF_2CF_2O)_2CF_3)$, and —$CH_3$.

18. The unit according to claim 1, wherein the fluorinated liquid comprises at least one of a hydrofluoroether or a hydrofluropolyether.

19. The unit according to claim 2, wherein the ionic fluorinated exchange liquid comprises at least one of 1-Ethyl-3-methylimidazolium bis(trifluoromethyl sulfonyl)imide, 1-Butyl-1-methylpyrrolidinium bis(trifluoromethyl sulfonyl)imide, 1-Butyl-3-methylpyridinium bis(trifluoromethyl sulfonyl)imide and 1-Ethyl-3-methylimidazolium bis(pentafluoroethyl sulfonyl)imide.

20. The unit according to claim 1, wherein the fluorinated liquid comprises 0.5% to 30% by volume of non-ionic fluorinated ion exchange liquid.

* * * * *